United States Patent
Weingaertner et al.

(10) Patent No.: US 9,799,902 B2
(45) Date of Patent: *Oct. 24, 2017

(54) PRE-REFORMER FOR SELECTIVE REFORMATION OF HIGHER HYDROCARBONS

(71) Applicant: BLOOM ENERGY CORPORATION, Sunnyvale, CA (US)

(72) Inventors: David Weingaertner, Sunnyvale, CA (US); Vlad Kalika, Dublin, CA (US); Martin Perry, Mountain View, CA (US)

(73) Assignee: BLOOM ENERGY CORPORATION, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/049,219

(22) Filed: Feb. 22, 2016

(65) Prior Publication Data
US 2016/0240876 A1 Aug. 18, 2016

Related U.S. Application Data

(63) Continuation of application No. 14/519,560, filed on Oct. 21, 2014, now Pat. No. 9,287,572.
(Continued)

(51) Int. Cl.
| | |
|---|---|
| H01M 8/04 | (2016.01) |
| H01M 8/0612 | (2016.01) |
| H01M 8/0637 | (2016.01) |
| H01M 8/243 | (2016.01) |
| H01M 8/00 | (2016.01) |
| H01M 8/124 | (2016.01) |

(52) U.S. Cl.
CPC ......... *H01M 8/0618* (2013.01); *H01M 8/004* (2013.01); *H01M 8/0631* (2013.01); *H01M 8/0637* (2013.01); *H01M 8/243* (2013.01); *C01B 2203/066* (2013.01); *H01M 2008/1293* (2013.01); *Y02E 60/566* (2013.01)

(58) Field of Classification Search
None
See application file for complete search history.

(56) References Cited

U.S. PATENT DOCUMENTS

| | | |
|---|---|---|
| 3,453,087 A | 7/1969 | Herp, Jr. et al. |
| 3,453,146 A | 7/1969 | Bawa et al. |
| | (Continued) | |

FOREIGN PATENT DOCUMENTS

| | | |
|---|---|---|
| DE | 4005468 A1 | 8/1991 |
| DE | 19924777 A1 | 11/2000 |
| | (Continued) | |

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
(Continued)

*Primary Examiner* — Tracy Dove
(74) *Attorney, Agent, or Firm* — The Marbury Law Group PLLC

(57) ABSTRACT

Systems and methods are provided integrating an annular pre-reformer as part of an anode recuperator of a fuel cell system.

21 Claims, 22 Drawing Sheets

Related U.S. Application Data

(60) Provisional application No. 61/894,485, filed on Oct. 23, 2013.

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,746,329 A | 5/1988 | Christner et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,091,075 A | 2/1992 | O'Neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,527,631 A | 6/1996 | Singh et al. |
| 5,573,867 A | 11/1996 | Zafred et al. |
| 5,601,937 A | 2/1997 | Isenberg |
| 5,641,585 A | 6/1997 | Lessing et al. |
| 5,686,196 A | 11/1997 | Singh et al. |
| 5,693,201 A | 12/1997 | Hsu et al. |
| 5,733,675 A | 3/1998 | Dederer et al. |
| 5,741,605 A | 4/1998 | Gillett et al. |
| 5,763,114 A | 6/1998 | Khandkar et al. |
| 5,955,039 A | 9/1999 | Dowdy |
| 6,013,385 A | 1/2000 | DuBose |
| 6,051,125 A | 4/2000 | Pham et al. |
| 6,106,964 A | 8/2000 | Voss et al. |
| 6,106,967 A | 8/2000 | Virkar et al. |
| 6,126,908 A | 10/2000 | Clawson et al. |
| 6,232,005 B1 | 5/2001 | Pettit |
| 6,280,865 B1 | 8/2001 | Eisman et al. |
| 6,309,770 B1 | 10/2001 | Nagayasu et al. |
| 6,329,090 B1 | 12/2001 | McElroy et al. |
| 6,348,278 B1 | 2/2002 | Lapierre et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | DuBose |
| 6,451,466 B1 | 9/2002 | Grasso et al. |
| 6,492,050 B1 | 12/2002 | Sammes |
| 6,531,243 B2 | 3/2003 | Thom |
| 6,582,842 B1 | 6/2003 | King |
| 6,623,880 B1 | 9/2003 | Geisbrecht et al. |
| 6,655,150 B1 | 12/2003 | Asen et al. |
| 6,656,625 B1 | 12/2003 | Thompson et al. |
| 6,749,958 B2 | 6/2004 | Pastula et al. |
| 6,793,698 B1 | 9/2004 | Sanger et al. |
| 6,821,663 B2 | 11/2004 | McElroy |
| 6,841,279 B1 | 1/2005 | Foger et al. |
| 6,880,628 B2 | 4/2005 | Yoshida et al. |
| 6,924,053 B2 | 8/2005 | McElroy |
| 7,067,208 B2 | 6/2006 | Gottmann et al. |
| 7,452,619 B2 | 11/2008 | Ahmed |
| 7,659,022 B2 | 2/2010 | Valensa et al. |
| 7,704,617 B2 | 4/2010 | Venkataraman |
| 7,705,490 B2 | 4/2010 | Srinivasan et al. |
| 7,713,649 B2 | 5/2010 | Hickey et al. |
| 7,736,774 B2 | 6/2010 | Ogiwara et al. |
| 7,974,106 B2 | 7/2011 | Gurunathan et al. |
| 8,057,944 B2 | 11/2011 | Venkataraman |
| 8,062,802 B2 | 11/2011 | Devriendt |
| 8,101,307 B2 | 1/2012 | McElroy et al. |
| 8,137,855 B2 | 3/2012 | Weingaertner et al. |
| 8,288,041 B2 | 10/2012 | Perry et al. |
| 2001/0009653 A1 | 7/2001 | Clawson et al. |
| 2001/0049035 A1 | 12/2001 | Haltiner, Jr. et al. |
| 2002/0004154 A1 | 1/2002 | Pastula et al. |

(56) References Cited

U.S. PATENT DOCUMENTS

| | | |
|---|---|---|
| 2002/0015867 A1 | 2/2002 | Cargnelli et al. |
| 2002/0028362 A1 | 3/2002 | Prediger et al. |
| 2002/0058175 A1 | 5/2002 | Ruhl |
| 2002/0106544 A1 | 8/2002 | Noetzel et al. |
| 2002/0142198 A1 | 10/2002 | Towler et al. |
| 2002/0142208 A1 | 10/2002 | Keefer et al. |
| 2002/0192516 A1 | 12/2002 | Tajima |
| 2003/0021741 A1 | 1/2003 | Childress et al. |
| 2003/0031904 A1 | 2/2003 | Haltiner |
| 2003/0049502 A1 | 3/2003 | Dickman et al. |
| 2003/0143448 A1 | 7/2003 | Keefer |
| 2003/0157386 A1 | 8/2003 | Gottmann |
| 2003/0162067 A1 | 8/2003 | McElroy |
| 2003/0196893 A1 | 10/2003 | McElroy |
| 2003/0205641 A1 | 11/2003 | McElroy |
| 2003/0235725 A1 | 12/2003 | Haltiner et al. |
| 2004/0018144 A1 | 1/2004 | Briscoe |
| 2004/0089438 A1 | 5/2004 | Valensa et al. |
| 2004/0096713 A1 | 5/2004 | Ballantine et al. |
| 2004/0131912 A1 | 7/2004 | Keefer et al. |
| 2004/0142215 A1 | 7/2004 | Barbir et al. |
| 2004/0191597 A1 | 9/2004 | McElroy |
| 2004/0191598 A1 | 9/2004 | McElroy |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2004/0258587 A1 | 12/2004 | Bowe et al. |
| 2005/0048334 A1 | 3/2005 | Sridhar et al. |
| 2005/0048336 A1 | 3/2005 | Takebe et al. |
| 2005/0048338 A1 | 3/2005 | Kobayashi et al. |
| 2005/0053814 A1 | 3/2005 | Imamura et al. |
| 2005/0056412 A1 | 3/2005 | Reinke et al. |
| 2005/0106429 A1 | 5/2005 | Keefer |
| 2005/0164051 A1 | 7/2005 | Venkataraman et al. |
| 2005/0204628 A1 | 9/2005 | Deshpande |
| 2005/0249988 A1 | 11/2005 | Pearson |
| 2006/0083964 A1 | 4/2006 | Edlinger et al. |
| 2006/0147771 A1 | 7/2006 | Russell et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2007/0017367 A1 | 1/2007 | McElroy et al. |
| 2007/0017368 A1 | 1/2007 | Levan et al. |
| 2007/0017369 A1 | 1/2007 | Levan et al. |
| 2007/0111053 A1 | 5/2007 | Penev et al. |
| 2007/0178338 A1 | 8/2007 | McElroy et al. |
| 2007/0196704 A1 | 8/2007 | Valensa |
| 2007/0231628 A1 | 10/2007 | Lyle et al. |
| 2007/0231635 A1 | 10/2007 | Venkataraman et al. |
| 2007/0243435 A1 | 10/2007 | Dutta |
| 2007/0243444 A1 | 10/2007 | Zheng et al. |
| 2007/0269693 A1 | 11/2007 | Perry |
| 2008/0038600 A1 | 2/2008 | Valensa et al. |
| 2008/0050632 A1 | 2/2008 | Salter et al. |
| 2008/0057359 A1 | 3/2008 | Venkataraman et al. |
| 2008/0197190 A1 | 8/2008 | Fujita |
| 2009/0029204 A1 | 1/2009 | Venkataraman et al. |
| 2009/0029205 A1 | 1/2009 | Venkataraman et al. |
| 2009/0042068 A1 | 2/2009 | Weingaertner |
| 2009/0208784 A1 | 8/2009 | Perry et al. |
| 2010/0009221 A1 | 1/2010 | Ballantine et al. |
| 2010/0203416 A1 | 8/2010 | Venkataraman |
| 2010/0239924 A1 | 9/2010 | McElroy |
| 2011/0039183 A1 | 2/2011 | Armstrong et al. |
| 2011/0053027 A1 | 3/2011 | Weingaertner |
| 2011/0281185 A1 | 11/2011 | Sridhar et al. |
| 2012/0178003 A1* | 7/2012 | Venkataraman ........ H01M 2/00 429/408 |
| 2012/0196194 A1 | 8/2012 | Perry et al. |
| 2012/0196195 A1 | 8/2012 | Perry et al. |
| 2012/0202130 A1 | 8/2012 | Weingaertner et al. |
| 2012/0270117 A9 | 10/2012 | Venkataraman et al. |
| 2015/0111121 A1 | 4/2015 | Weingaertner et al. |

FOREIGN PATENT DOCUMENTS

| | | |
|---|---|---|
| DE | 102006019409 A1 | 10/2007 |
| EP | 0 398 111 A1 | 11/1990 |
| EP | 0 977 294 B1 | 2/2000 |
| EP | 1057998 B1 | 11/2003 |
| EP | 1 501 146 A2 | 1/2005 |
| EP | 1513208 | 3/2005 |
| EP | 1571726 A1 | 9/2005 |
| EP | 1258453 B1 | 1/2007 |
| JP | 2004-270803 | 4/1994 |
| JP | 2001-307703 A | 11/2001 |
| JP | 2004-247290 | 9/2004 |
| WO | WO 94/18712 | 8/1994 |
| WO | WO00/61707 A1 | 10/2000 |
| WO | WO0113452 A1 | 2/2001 |
| WO | WO03/019707 | 3/2003 |
| WO | WO2004/013258 A1 | 2/2004 |
| WO | WO2004/076017 | 9/2004 |
| WO | WO 2004/092756 | 10/2004 |
| WO | WO2004/093214 | 10/2004 |
| WO | WO2004/095618 | 11/2004 |

OTHER PUBLICATIONS

Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.

Austin, "Cell and Stack Construction: Low-Temperature Cells," *Fuel Cells: A Review of Government-Sponsored Research, 1950-1964*, NASA SP-120, pp. 101-120, (1967).

"Low Cost, Compact Solid Oxide Fuel Cell Generator," (Technology Management Inc.).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

Supplemental European Search Report and Opinion, Intl. Application PCT/US2008/009069, mailed Nov. 4, 2011, 5 pages.

"Type BPL Granular Carbon", Calgon Product Bulletin, Calgon Corporation, Activated Carbon Division, 2 pgs.

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1-9-4; 9-12-9-14.

LeVan, M. Douglas et al., "Adsorption and Ion Exchange", Perry's Chemical Engineers' Handbook ($7^{th}$ Edition), 1997, 66 pgs.

Levan, M. Douglas et al., "Fixed-Bed Adsorption of Gases: Effect of Velocity Variations on Transition Types", AIChE Journal, vol. 34, No. 6, Jun. 1988, pp. 996-1005.

Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

(56) References Cited

OTHER PUBLICATIONS

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al., "Adsorption of carbon dioxide at high temperature—a review", Separation and Purification Technology, vol. 26, 2002, pp. 195-205.

Supplemental European Search Report and European Search Opinion, EP Application No. 06800263, Oct. 16, 2009, 11pgs.

Notification of Reasons of Refusal issued in Japanese Patent Application No. 2008-524022, Jan. 24, 2012.

International Search Report and Written Opinion, International Application No. PCT/US2014/061511, issued Jan. 28, 2015.

International Preliminary Report on Patentability and Written Opinion of the International Searching Authority for International Application No. PCT/US2014/061511, dated May 6, 2016, 10 pages.

Extended European Search Report for European Patent Application No. 14855637.6 (PCT/US2014/061511), dated Jun. 29, 2017, 7 pages.

* cited by examiner

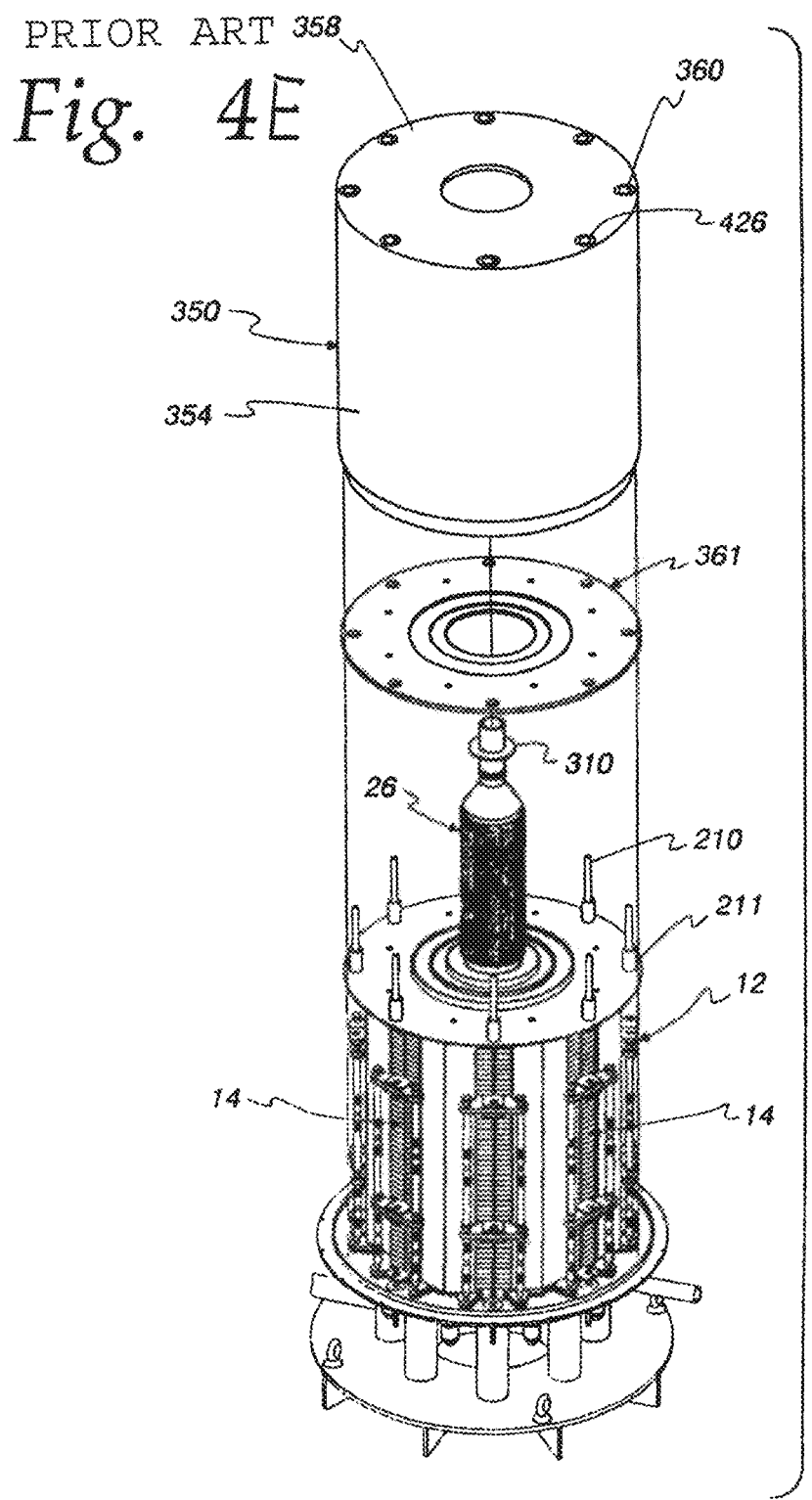

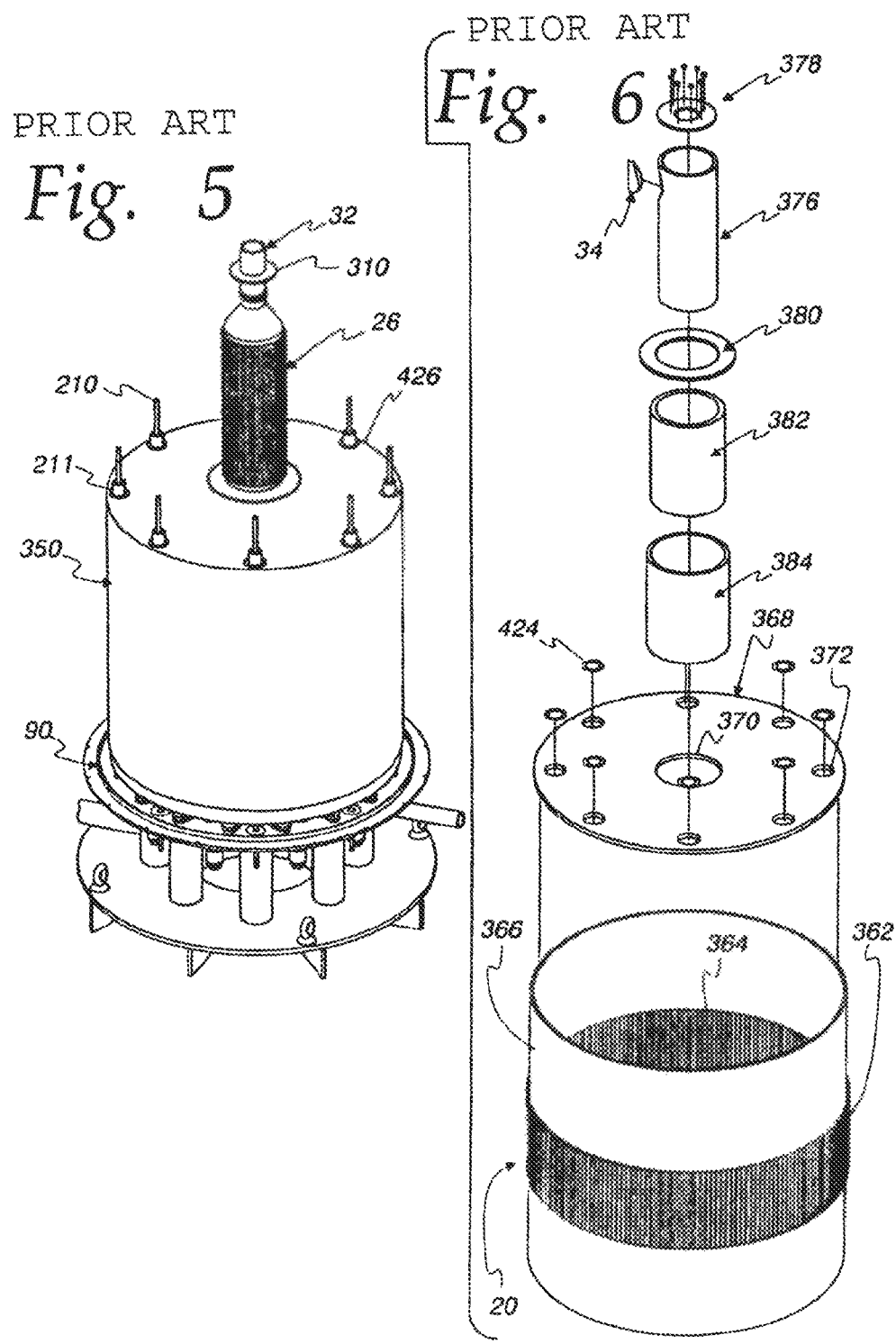

PRE-REFORMER FOR SELECTIVE REFORMATION OF HIGHER HYDROCARBONS

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

FIGS. 1-9 illustrate a prior art fuel cell system described in U.S. Published Application 2010/0009221 published on Jan. 14, 2010 (filed as Ser. No. 12/458,171 and incorporated herein by reference in its entirety). Specifically, with reference to FIGS. 1, 2A, 2B and 3A, an integrated fuel cell unit 10 is shown in form of an integrated solid oxide fuel cell ("SOFC")/fuel processor 10 having a generally cylindrical construction. The unit 10 includes an annular array 12 of eight (8) fuel cell stacks 14 surrounding a central axis 16, with each of the fuel cell stacks 14 having a stacking direction extended parallel to the central axis 16, with each of the stacks having a face 17 that faces radially outward and a face 18 that faces radially inward. As best seen in FIG. 3A the fuel cell stacks 14 are spaced angularly from each other and arranged to form a ring-shaped structure about the axis 16. Because there are eight of the fuel cell stacks 14, the annular array 12 could also be characterized as forming an octagon-shaped structure about the axis 16. While eight of the fuel cell stacks 14 have been shown, it should be understood that the invention contemplates an annular array 12 that may include more than or less than eight fuel cell stacks.

With reference to FIG. 1, the unit 10 further includes an annular cathode recuperator 20 located radially outboard from the array 12 of fuel stacks 14, an annular anode recuperator 22 located radially inboard from the annular array 12, a reformer 24 also located radially inboard of the annular array 12, and an annular anode exhaust cooler/cathode preheater 26, all integrated within a single housing structure 28. The housing structure 28 includes an anode feed port 30, an anode exhaust port 32, a cathode feed port 34, a cathode exhaust port 36, and an anode combustion gas inlet port 37. An anode exhaust combustor (typically in the form an anode tail gas oxidizer (ATO) combustor), shown schematically at 38, is a component separate from the integrated unit 10 and receives an anode exhaust flow 39 from the port 32 to produce an anode combustion gas flow 40 that is delivered to the anode combustion gas inlet 37. During startup, the combustor 38 also receives a fuel flow (typically natural gas), shown schematically by arrow 41. Additionally, some of the anode exhaust flow may be recycled to the anode feed port 30, as shown by arrows 42. In this regard, a suitable valve 43 may be provided to selectively control the routing of the anode exhaust flow to either the combustor 38 or the anode feed port 30. Furthermore, although not shown, a blower may be required in order to provide adequate pressurization of the recycled anode exhaust flow 42. While FIGS. 1, 2A and 2B are section views, it will be seen in the later figures that the components and features of the integrated unit 10 are symmetrical about the axis 16, with the exception of the ports 34, 36 and 37.

With reference to FIG. 1 and FIG. 2A, the cathode flows will be explained in greater detail. As seen in FIG. 1, a cathode feed (typically air), shown schematically by arrows 44, enters the unit 10 via the port 34 and passes through an annular passage 46 before entering a radial passage 48. It should be noted that as used herein, the term "radial passage" is intended to refer to a passage wherein a flow is directed either radially inward or radially outward in a generally symmetric 360 degree pattern. The cathode feed 44 flows radially outward through the passage 48 to an annular passage 50 that surrounds the array 12 and passes through the cathode recuperator 20. The cathode feed 44 flows downward through the annular passage 50 and then flows radially inward to an annular feed manifold volume 52 that surrounds the annular array 12 to distribute the cathode feed 44 into each of the fuel cell stacks 14 where the cathode feed provides oxygen ions for the reaction in the fuel cell stacks 14 and exits the fuel cell stacks 14 as a cathode exhaust 56. The cathode exhaust 56 then flows across the reformer 24 into an annular exhaust manifold area 58 where it mixes with the combustion gas flow 40 which is directed into the manifold 58 via an annular passage 60. In this regard, it should be noted that the combustion gas flow 40 helps to make up for the loss of mass in the cathode exhaust flow 56 resulting from the transport of oxygen in the fuel cell stacks 14. This additional mass flow provided by the combustion gas flow 40 helps in minimizing the size of the cathode recuperator 20. The combined combustion gas flow 40 and cathode exhaust 56, shown schematically by arrows 62, exits the manifold 58 via a central opening 64 to a radial passage 66. The combined exhaust 62 flows radially outward through the passage 66 to an annular exhaust flow passage 68 that passes through the cathode recuperator 20 in heat exchange relation with the passage 50 to transfer heat from the combined exhaust 62 to the cathode feed 44. The combined exhaust 62 flows upward through the annular passage 68 to a radial passage 70 which directs the combined exhaust 62 radially inward to a final annular passage 72 before exiting the unit 10 via the exhaust port 36.

With reference to FIG. 1 and FIG. 2B, an anode feed, shown schematically by arrows 80, enters the unit 10 via the anode feed inlet port 30 preferably in the form of a mixture of recycled anode exhaust 42 and methane. The anode feed 80 is directed to an annular passage 82 that passes through the anode recuperator 22. The anode feed 80 then flows to a radial flow passage 84 where anode feed 80 flows radially outward to an annular manifold or plenum 86 that directs the anode feed into the reformer 24. After being reformed in the reformer 24, the anode feed 80 exits the bottom of reformer 24 as a reformate and is directed into an integrated pressure plate/anode feed manifold 90. The feed manifold 90 directs the anode feed 80 to a plurality of stack feed ports 92, with one of the ports 92 being associated with each of the fuel cell stacks 14. Each of the ports 92 directs the anode feed 80 into a corresponding anode feed/return assembly 94 that directs the anode feed 82 into the corresponding fuel cell stack 14 and collects an anode exhaust, shown schematically by arrows 96, from the corresponding stack 14 after the anode feed reacts in the stack 14. Each of the anode feed/return assemblies 94 directs the anode exhaust 96 back into a corresponding one of a plurality of stack ports 98 in the pressure plate/manifold 90 (again, one port 98 for each of the fuel cell stacks 14). The manifold 90 directs the anode exhaust 96 radially inward to eight anode exhaust ports 100 (again, one for each stack 14) that are formed in the pressure plate/manifold 90. The anode exhaust 96 flows through the ports 100 into a plurality of corresponding anode exhaust tubes 102 which direct the anode exhaust 96 to a radial anode exhaust flow passage 104. The anode exhaust 96 flows radially inward through the passage 104 to an annular flow passage 106 that passes downward through the anode recuperator 22 in heat exchange relation with the flow passage 82. The anode exhaust 96 is then directed from the annular passage 106 upward into a tubular passage 108 by a baffle/cover 110 which is preferably dome-shaped. The anode exhaust 96 flows upwards through the passage 108 before being directed into another annular passage 112 by a baffle/cover 114, which again is preferably dome-shaped. The annular passage 112 passes through the anode cooler 26 in heat exchange relation with the annular cathode feed passage 46. After transferring heat to the cathode feed 44, the anode exhaust 96 exits the annular passage 112 and is directed by a baffle 116, which is preferably cone-shaped, into the anode exhaust port 32.

With reference to FIGS. 3A, 3B, the reformer 24 is provided in the form of an annular array 280 of eight tube sets 282, with each tube set 282 corresponding to one of the fuel cell stacks 14 and including a row of flattened tubes 284. In this regard, it should be noted that the number of tubes 284 in the tube sets 282 will be highly dependent upon the particular parameters of each application and can vary from unit 10 to unit 10 depending upon those particular parameters.

FIG. 3C is intended as a generic figure to illustrate certain construction details common to the cathode recuperator 20, the anode recuperator 22, and the anode cooler 26. The construction of each of these three heat exchangers basically consists of three concentric cylindrical walls A, B, C that define two separate flow passages D and E, with corrugated or serpentine fin structures G and H provided in the flow passages D and E, respectively, to provide surface area augmentation of the respective flow passages. Because the heat transfer occurs through the cylindrical wall B, it is preferred that the fins G and H be bonded to the wall B in order to provide good thermal conductivity, such as by brazing. On the other hand, for purposes of assembly and/or allowing differential thermal expansion, it is preferred that the fins G and H not be bonded to the cylindrical walls A and C. For each of the heat exchangers 20, 22 and 26, it should be understood that the longitudinal length and the specific geometry of the fins G and H in each of the flow paths D and E can be adjusted as required for each particular application in order to achieve the desired output temperatures and allowable pressure drops from the heat exchangers.

Turning now to FIG. 4A-D, the anode cooler 26 includes a corrugated or serpentine fin structure 300 to provide surface area augmentation for the anode exhaust 96 in the passage 112, a corrugated or serpentine fin structure 302 that provides surface area augmentation for the cathode feed flow 44 in the passage 46, and a cylindrical wall or tube 304 to which the fins 300 and 302 are bonded, preferably by brazing, and which serves to separate the flow passage 46 from the flow passage 112. As best seen in FIG. 4B, a cylindrical flow baffle 306 is provided on the interior side of the corrugated fin 300 and includes the dome-shaped baffle 114 on its end in order to define the inner part of flow passage 112. A donut-shaped flow baffle 308 is also provided to direct the cathode feed 44 radially outward after it exists the flow passage 46. The cone-shaped baffle 116 together with the port 32 are attached to the top of the tube 304, and include a bolt flange 310 that is structurally fixed, by a suitable bonding method such as brazing or welding, to the port 32, which also includes a bellows 311 to allow for thermal expansion between the housing 28 and the components connected through the flange 310. As seen in FIG. 4C, the above-described components can be assembled as yet another subassembly that is bonded together, such as by brazing.

In reference to FIGS. 1 and 4D, it can be seen that the anode recuperator 22 includes a corrugated or serpentine fin structure 312 in the annular flow passage 82 for surface area augmentation for anode feed 80. As best seen in FIG. 1, the anode recuperator 22 further includes another corrugated or serpentine fin structure 314 in the annular flow passage 106 for surface augmentation of the anode exhaust 96.

As best seen in FIG. 4D, corrugated fins 312 and 314 are preferably bonded to a cylindrical wall of tube 316 that serves to separate the flow passages 82 and 106 from each other, with the dome-shaped baffle 110 being connected to the bottom end of the wall 316. Another cylindrical wall or tube 320 is provided radially inboard from the corrugated fin 314 (not shown in FIG. 4D, but in a location equivalent to fin 300 in cylinder 304 as seen in FIG. 4B) to define the inner side of the annular passage 106, as best seen in FIG. 4D. As seen in FIG. 2A, an insulation sleeve 322 is provided within the cylindrical wall 320 and a cylindrical exhaust tube 324 is provided within the insulation sleeve 322 to define the passage 108 for the anode exhaust 96. Preferably, the exhaust tube 324 is joined to a conical-shaped flange 328 provided at a lower end of the cylindrical wall 320. With reference to FIG. 4D, another cylindrical wall or tube 330 surrounds the corrugated fin 312 to define the radial outer limit of the flow passage 82 and is connected to the inlet port 30 by a conical-shaped baffle 332. A manifold disk 334 is provided at the upper end of the wall 316 and includes a central opening 336 for receiving the cylindrical wall 320, and eight anode exhaust tube receiving holes 338 for sealingly receiving the ends of the anode exhaust tubes 102, with the plate 308 serving to close the upper extent of the manifold plate 334 in the assembled state.

With reference to FIGS. 2B and 4E, a heat shield assembly 350 is shown and includes an inner cylindrical shell 352 (shown in FIG. 2B), an outer cylindrical shell 354, an insulation sleeve 356 (shown in FIG. 2B) positioned between the inner and outer shells 352 and 354, and a disk-shaped cover 358 closing an open end of the outer shell 350. The cover 358 includes eight electrode clearance openings 360 for through passage of the electrode sleeves 211. As seen in FIG. 4E, the heat shield assembly 350 is assembled over an insulation disk 361 the outer perimeter of the assembled array 12 of fuel cells 14 and defines the outer extent of the cathode feed manifold 52. The heat shield 350 serves to retain the heat associated with the components that it surrounds. FIG. 5 shows the heat shield assembly 350 mounted over the stacks 14.

With reference to FIG. 1 and FIG. 6, the cathode recuperator 20 includes a corrugated or serpentine fin structure 362 to provide surface enhancement in the annular flow passage 68 for the combined exhaust 62, a corrugated or serpentine fin structure 364 to provide surface enhancement in the annular flow passage 50 for the cathode feed 44, and a cylindrical tube or wall 366 that separates the flow passages 50 and 68 and to which the fins 362 and 364 are bonded. A disk-shaped cover plate 368 is provided to close the upper opening of the cylindrical wall 366 and includes a central opening 370, and a plurality of electrode clearance openings 372 for the passage of the electrode sleeve 211 therethrough. A cylindrical tube or sleeve 376 is attached to the cover 368 to act as an outer sleeve for the anode cooler 26, and an upper annular bolt flange 378 is attached to the top of the sleeve 376. A lower ring-shaped bolt flange 380 and an insulation sleeve 382 are fitted to the exterior of the sleeve 376, and a cylindrical wall or shield 384 surrounds the insulation sleeve 382 and defines an inner wall for the passage 72, as best seen in FIGS. 1 and 6.

With reference to FIG. 7, the components of FIG. 6 are then assembled over the components shown in FIG. 5 with the flange 378 being bolted to the flange 310.

With reference to FIG. 4A, the outer housing 28 is assembled over the remainder of the unit 10 and bolted thereto at flange 380 and a flange 400 of the housing 28, and at flange 402 of the assembly 237 and a flange 404 of the housing 28, preferably with a suitable gasket between the flange connections to seal the connections.

FIG. 9 is a schematic representation of the previously described integrated unit 10 showing the various flows through the integrated unit 10 in relation to each of the major components of the integrated unit 10. FIG. 9 also shows an optional air cooled anode condenser 460 that is preferably used to cool the anode exhaust flow 39 and condense water therefrom prior to the flow 39 entering the combustor 38. If desired, the condenser may be omitted. FIG. 9 also shows a blower 462 for providing an air flow to the combustor 38, a blower 464 for providing the cathode feed 44, and a blower 466 for pressurizing the anode recycle flow 42. If desired, in an alternate embodiment of the unit 10 shown in FIG. 9 also differs from the previously described embodiment shown in FIG. 1 in that an optional steam generator (water/combined exhaust heat exchanger) 440 is added in order to utilize waste heat from the combined exhaust 62 to produce steam during startup. In this regard, a water flow 442 is provided to a water inlet port 444 of the heat exchanger 440, and a steam outlet port directs a steam flow 448 to be mixed with the anode feed 80 for delivery to the anode feed inlet port 30.

SUMMARY

The embodiments of the invention provide systems and methods for integrating an annular pre-reformer as part of an anode recuperator of a fuel cell system. In an embodiment, an anode recuperator for a fuel cell system may comprise a first annular fuel passage, wherein an inner wall of the first annular fuel passage is configured to form an upper plenum surrounded by the first annular fuel passage; an annular pre-reformer coupled to the first annular fuel passage and configured to receive an unreformed fuel stream from the first annular fuel passage and at least partially reform the unreformed fuel stream to generate a reformed fuel stream, the annular pre-reformer located axially inward of the first annular fuel passage; and an annular anode exhaust passage surrounding at least a portion of the first annular fuel passage and the annular pre-reformer, the annular anode exhaust passage thermally coupled to the first annular fuel passage such that an anode exhaust stream in the annular anode exhaust passage provides heat to the unreformed fuel stream in the first annular fuel passage, wherein the annular pre-reformer is separated from the annular anode exhaust passage.

In an embodiment, a method of operating an anode recuperator of a fuel cell system may comprise pre-reforming an unreformed fuel stream at a temperature less than or equal to 750 degrees Celsius to selectively reform higher hydrocarbons in the unreformed fuel stream over methane in the unreformed fuel stream to generate a reformed fuel stream.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 4E is an exploded perspective view showing the components of the fuel cell stacks, anode recuperator and anode cooler together with an insulation disk and heat shield housing of the integrated unit of FIG. 1.

FIG. 5 is a perspective view showing the assembled state of the components of FIG. 4E.

FIG. 6 is an exploded perspective view showing a cathode recuperator assembly together with other components of the integrated unit of FIG. 1.

DETAILED DESCRIPTION

Figure 1:
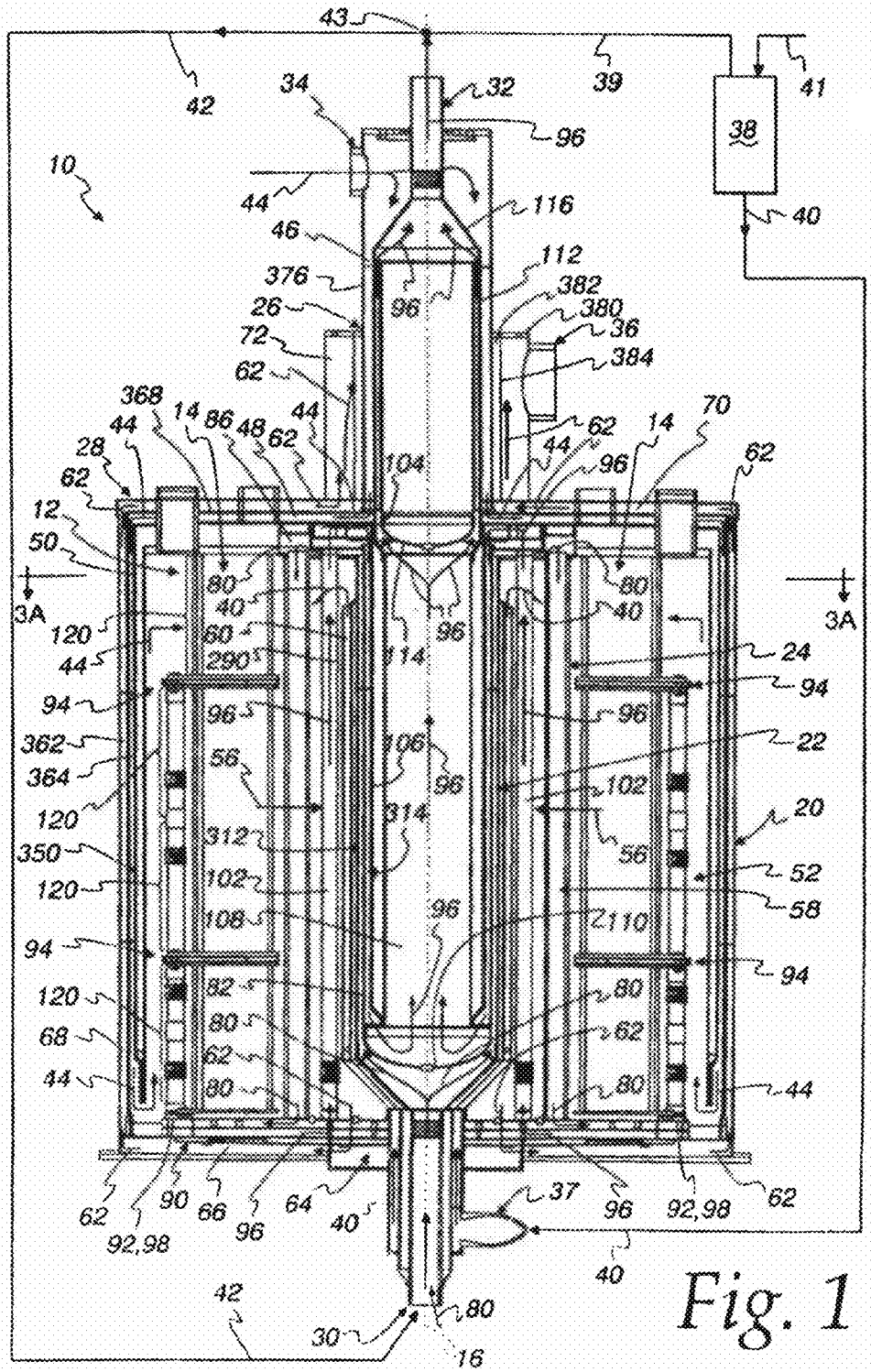
FIG. 1 is a sectional view of a prior art fuel cell unit with an integrated SOFC and fuel processor.
Figure 2A:
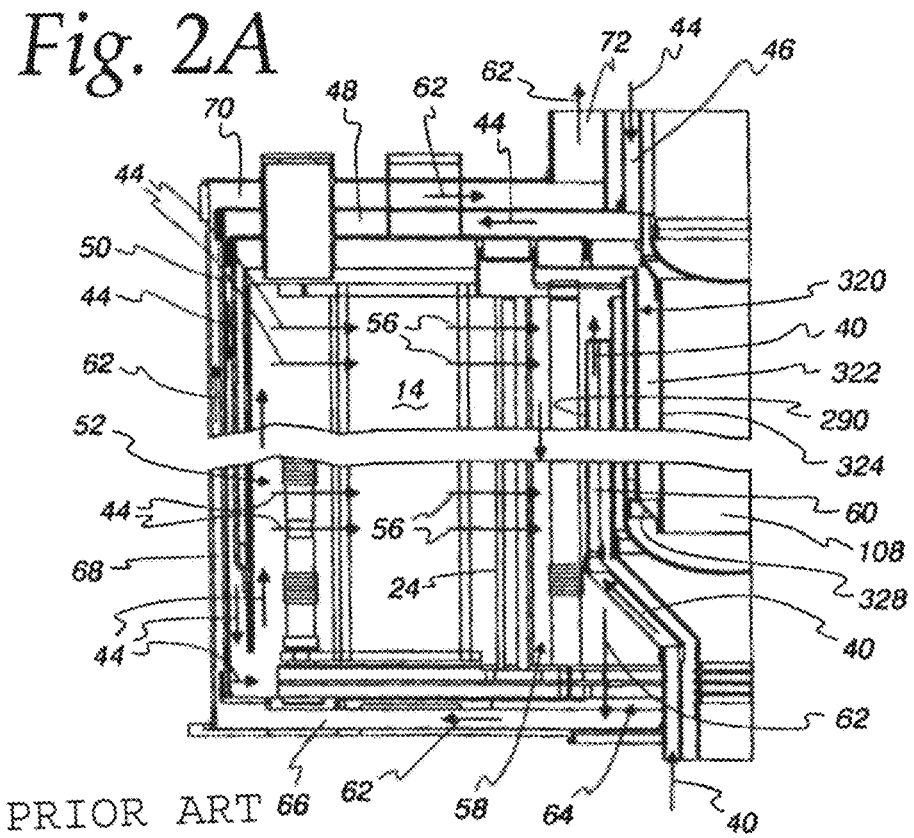
FIGS. 2A and 2B are sectional views showing one half of the prior art fuel cell unit of FIG. 1, with FIG. 2A illustrating the flows of the cathode feed and exhaust gases and FIG. 2B illustrating the flows of the anode feed and exhaust gases.
Figure 2B:
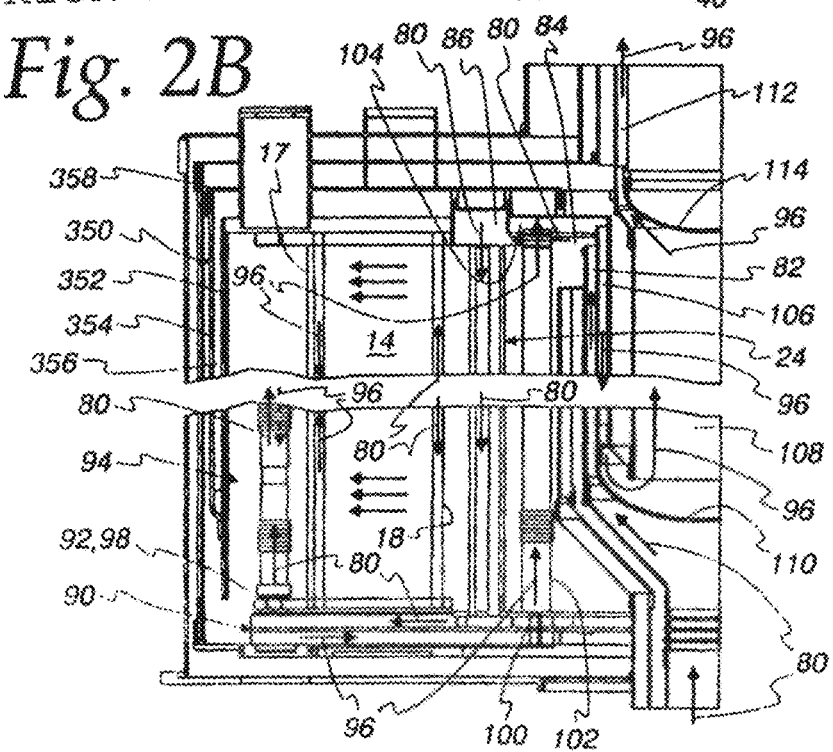
Figure 3A:
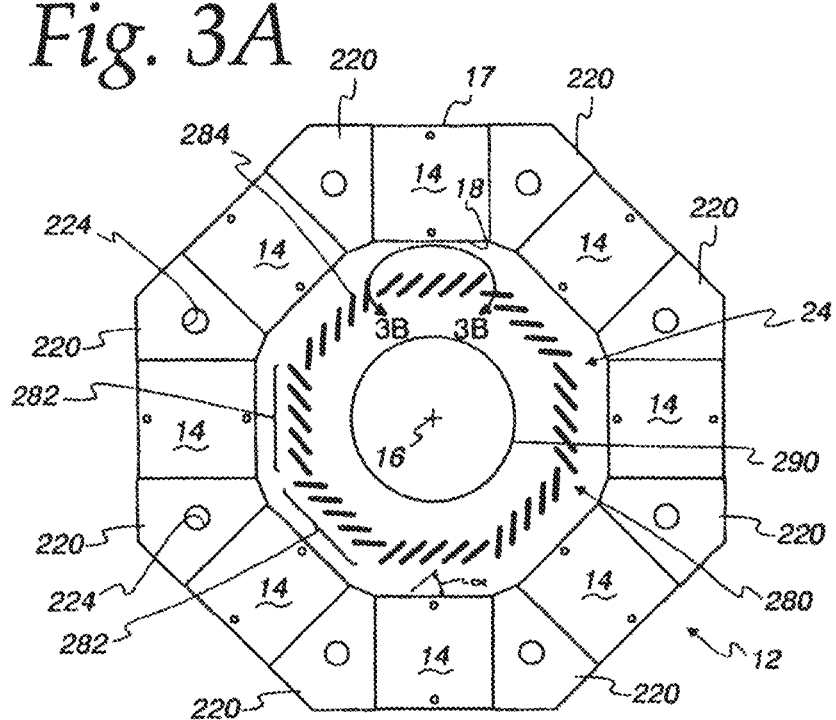
FIG. 3A is a sectional view taken from line 3A-3A in FIG. 1, but showing only selected components of the fuel cell unit.
Figure 3B:
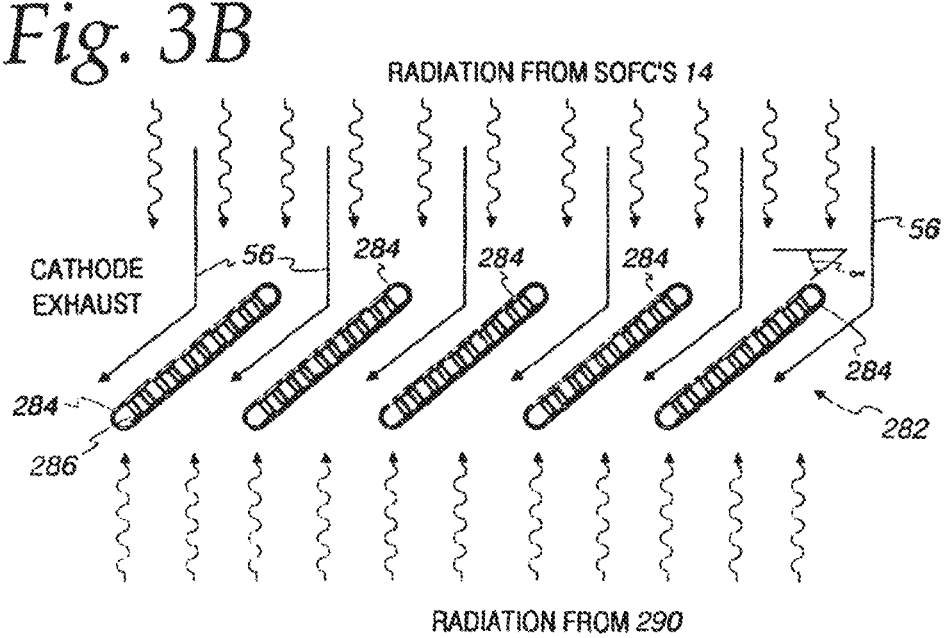
FIG. 3B is an enlarged, somewhat schematic view taken from line 3B-3B in FIG. 3A.
Figure 4A:
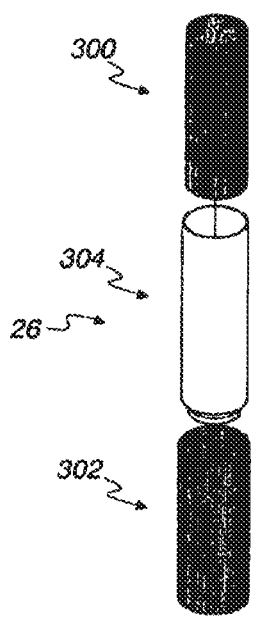
FIGS. 4A and 4B are exploded perspective views of the components of an anode exhaust cooler of the integrated unit of FIG. 1.
Figure 4B:
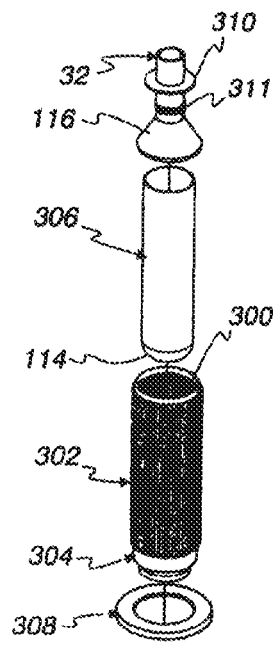
Figure 4C:
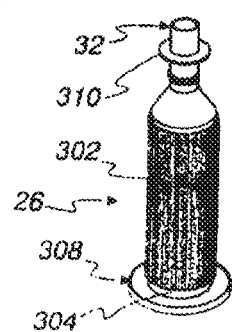
FIG. 4C is a perspective view showing the components of FIGS. 4A and B in their assembled state.
Figure 3C:
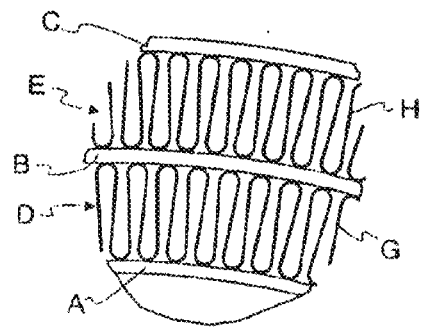
FIG. 3C is a partial section view illustrating construction details common to several heat exchangers contained within the integrated unit of FIG. 1.
Figure 4D:
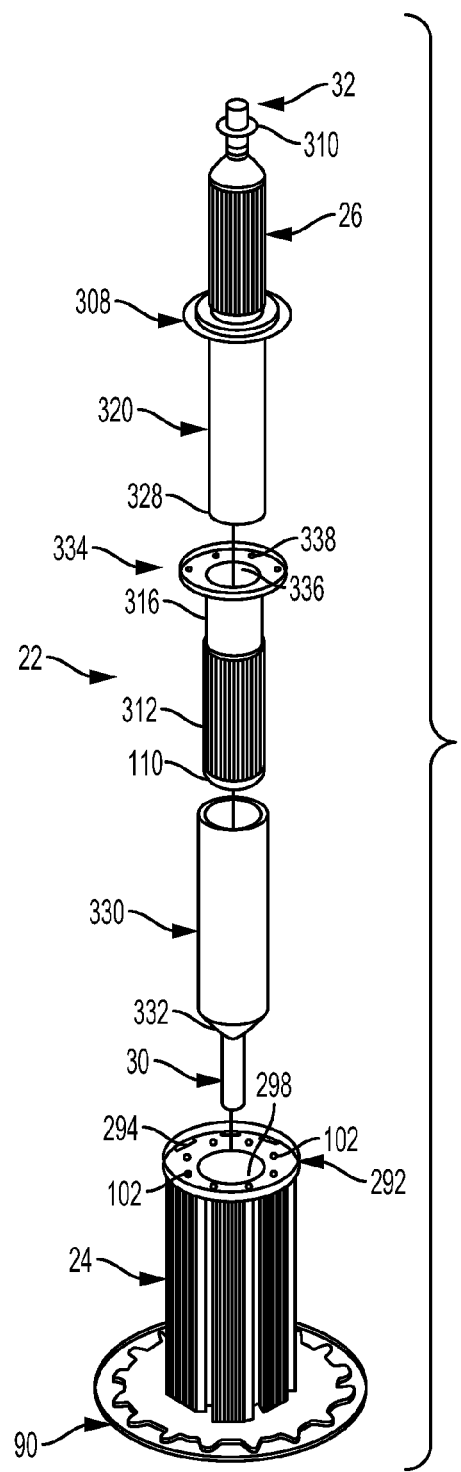
FIG. 4D is an exploded perspective view showing the assembled components together with an anode recuperator of the integrated unit of FIG. 1.
Figures 7, 8:
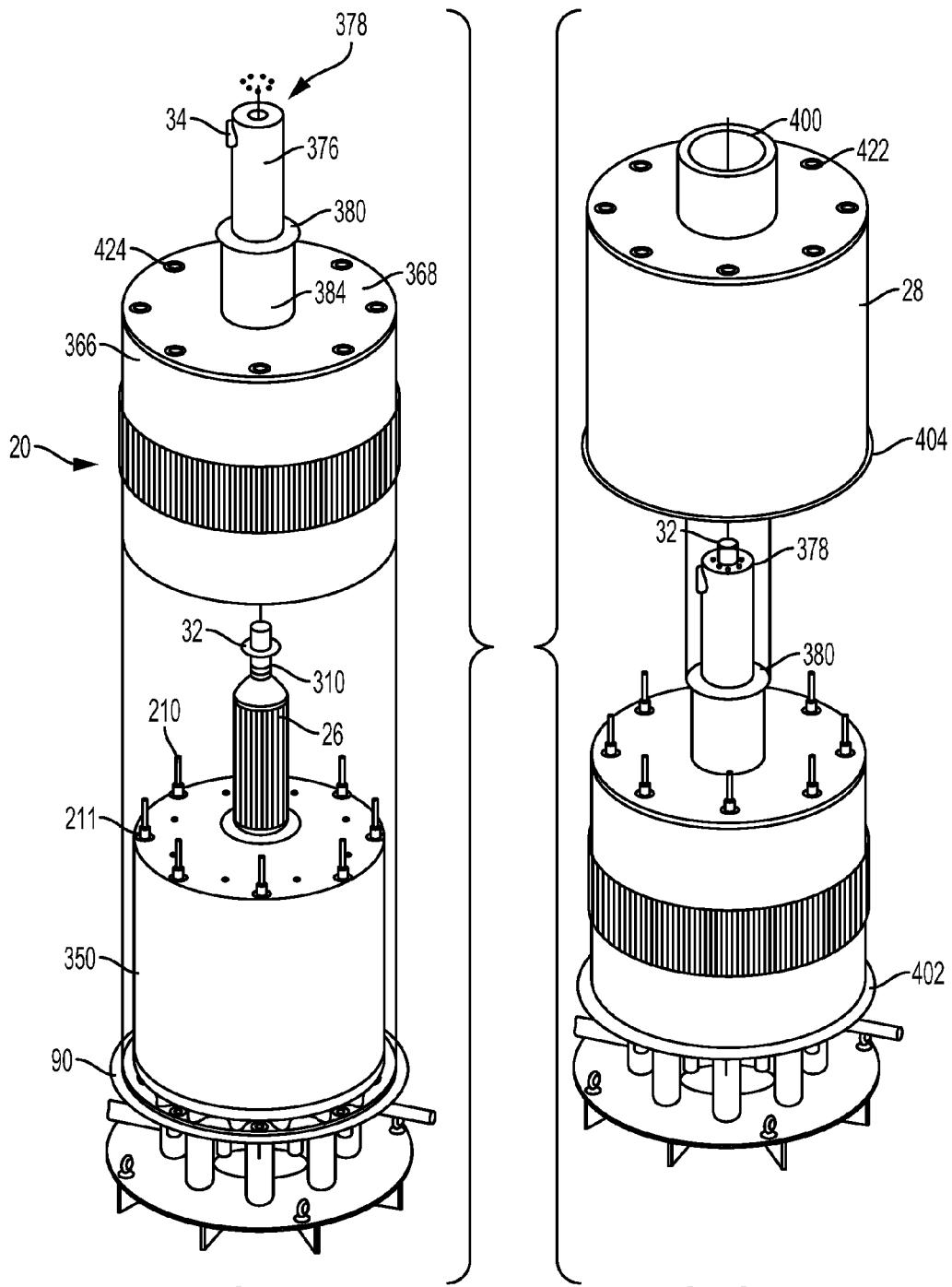
FIG. 7 is an exploded perspective view showing the assembled components of FIG. 6 together with the assembled components of FIG. 4.
FIG. 8 is an exploded perspective view showing the assembled components of FIG. 7 together with an outer housing of the integrated unit of FIG. 1.
Figure 9:
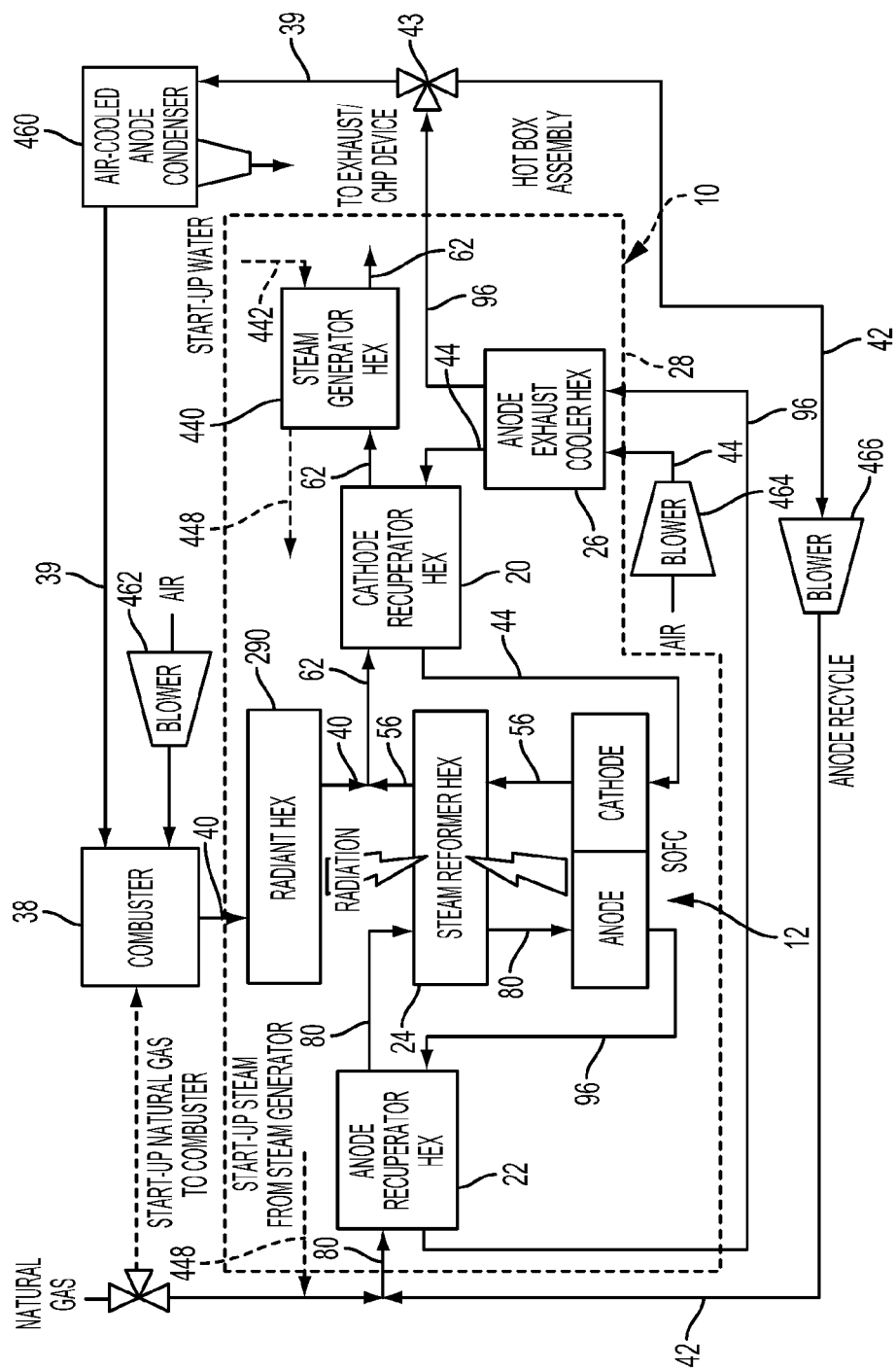
FIG. 9 is a schematic representation of the fuel cell unit if FIG. 1.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Methane reformation on a fuel cell stack of a fuel cell system may be preferable to methane reformation in a reformer or pre-reformer disposed in the fuel supply system of a fuel cell system prior to the fuel cell stack as the endothermic on cell reformation of methane may help to cool the fuel cell stack during power generation.

The systems, methods, and devices of the various embodiments provide an annular pre-reformer integrated as part of an anode recuperator of a fuel cell system. The pre-reformer converts a high percentage of higher hydrocarbons in the fuel inlet stream while not converting too much methane in the fuel inlet stream to hydrogen. In an embodiment, the placement of the annular pre-reformer in a cooler section of the fuel cell system allows the annular pre-reformer to remove higher hydrocarbons (i.e., reform the higher hydrocarbons into hydrogen, carbon monoxide, and carbon dioxide) before the higher hydrocarbons reach high temperature portions of the fuel cell system, such as the fuel cell stack, and have a chance to coke the anode electrodes of the fuel cells in the fuel cell stack.

In an embodiment, the annular pre-reformer may be located in a section of the fuel cell system that is maintained at a temperature of less than or equal to 750 degrees Celsius, such as 350-750, 350-500, 350-450, 450-500, 500-550, 550-600, 600-650, 650-700, 700-750, 600-750, etc. degrees Celsius, during operation of the fuel cell system to generate electricity. For example, the annular pre-reformer may be located in a horizontal portion of an anode recuperator. The fuel exhaust in the anode recuperator may be at a temperature of 600-750 degrees Celsius, while the annular pre-reformer may be located in portion of the anode recuperator having a temperature below 675 degrees Celsius (not counting the fuel inlet temperature which may be higher). The temperature in the horizontal portion of the anode recuperator may be lower, such as 350-675, 350-500, 350-450, 450-500, 500-550, 550-600, 600-650, 650-675, etc. degrees Celsius, as compared to the location of reformer 24, as shown in FIGS. 1-3 and 9, located at the end of or after an anode recuperator which may operate at 680-740 degrees Celsius. A lower temperature, such as 450-500 degrees Celsius, of the annular pre-reformer in the horizontal portion of the anode recuperator may make a pre-reforming catalyst in an annular pre-reformer less active when compared to a reformer in a higher temperature location, but equilibrium may limit the methane conversion in the annular pre-reformer to 50%, such as 10 to 50%, such as 10-20%, 20-30%, 30-40%, 40-50%, 20-50%, etc., while still favoring essentially complete conversion of higher hydrocarbons (i.e., conversion to hydrogen, carbon monoxide, and carbon dioxide). A still cooler temperature, such as 350-450 degrees Celsius, of the annular pre-reformer in the horizontal portion of the anode recuperator may limit methane reformation to near zero, or negative (i.e., methanation) while simultaneously allowing essentially complete conversion of higher hydrocarbons. The addition of an annular pre-reformer located in an anode recuperator may enable a reformer used in conjunction with the annular pre-reformer to be of shorter length when compared with a reformer used without an annular pre-reformer. The addition of an annular pre-reformer located in the anode recuperator may enable the reformer 24 of FIGS. 1-3 and 9 to be eliminated, and no reformer may be present between the annular pre-reformer and the fuel cell stack, which may preclude additional methane conversion between the annular pre-reformer and the fuel cell stack. In an embodiment, a length of a heat exchanger within the anode recuperator may be selected based on a target temperature and/or temperature range for the annular pre-reformer. The length of the heat exchanger and/or the design of the anode recuperator may be selected to maintain the annular pre-reformer at the target temperature and/or temperature range during operation of the fuel cell system to generate electricity. The target temperature and/or temperature range may be selected based on the properties (e.g., effectiveness, cost, etc.) of the catalyst located within the annular pre-reformer and/or an expected inlet fuel stream composition. As an example, a higher target temperature may be selected to support the conversion of higher hydrocarbons by a less effective catalyst (e.g., all nickel) while a lower target temperature may be selected for use with a more effective catalyst (e.g., all rhodium or all platinum). The target temperature and/or temperature range may be selected to favor the reformation of higher hydrocarbons over the reformation of methane in the annular pre-reformer. In an embodiment, the annular pre-reformer may be located within the anode recuperator but separated radially from the annular anode exhaust passage of the anode recuperator by one or more fuel inlet conduits. In this manner, the ambient temperature of the annular pre-reformer may be maintained at a temperature lower than the fuel inlet stream entering the annular pre-reformer from a fuel inlet passage of the anode recuperator and lower than the temperature of the anode exhaust in the anode exhaust passage. In an embodiment, additional heat may be added to the reformed fuel stream after the reformed fuel stream exits the annular pre-reformer.

Alternatively, the pre-reformer does not need to be annular. Additionally, the pre-reformer (annular or otherwise) may be located in other parts of the fuel cell system where the temperature is maintained at less than or equal to 750 degrees Celsius, e.g., 350-750, 350-500, 350-450, 450-500, 500-550, 550-600, 600-650, 650-700, 700-750, 600-750, etc. degrees Celsius.

In an embodiment, an annular pre-reformer may be an insert within an anode recuperator. In an embodiment, the annular pre-reformer may be located between a first annular fuel passage within the anode recuperator and a second annular fuel passage within the anode recuperator, and an annular anode exhaust passage may surround at least a portion of the first annular fuel passage, the annular pre-reformer, and the second annular fuel passage. In an embodiment, the annular pre-reformer may be in direct contact with, for example brazed to and/or resting against, an inner wall of the annular anode exhaust passage. This may help promote heat transfer from the annular anode exhaust passage to the annular pre-reformer. In another embodiment, the annular pre-reformer may not be in direct contact with an inner wall of the annular anode exhaust passage. Rather, the annular pre-reformer may be located within a central plenum of the anode recuperator, and fuel may be diverted from the first annular fuel passage into the central plenum and annular pre-reformer and back from the annular pre-reformer and central plenum to the second annular fuel passage.

In the various embodiments, the physical characteristics of the catalyst and/or catalyst support used in the annular pre-reformer may promote turbulence and/or mixing between the boundary layer near the surface of the catalyst and the bulk fuel flow. This may enable the annular pre-reformer catalyst to come in contact with essentially all of the fuel flow at some point, which may result in nearly complete conversion of higher hydrocarbons. In various embodiments, the catalyst in the annular pre-reformer may be a metallic/ceramic foam with a catalytic layer (e.g., nickel and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof.

The use of an annular pre-reformer according to the various embodiments in the fuel cell system may reduce the fuel cell stack degradation rate. Additionally, an annular pre-reformer used in conjunction with a reformer may lead to a longer operating life for a reformer when compared to a fuel cell system without an annular pre-reformer. An annular pre-reformer may allow the fuel cell system to run at a reduced steam to carbon ratio (S:C), reduced oxygen to carbon ratio (O:C), and/or reduced percentage anode stream recycled into the fuel inlet stream rate (% ANR), thereby increasing fuel cell stack voltage, reducing fuel cell stack size, and reducing anode side volume flow and backpressure which may result in less parasitic loss from an anode recycle blower. An annular pre-reformer may allow the fuel cell system to run with less methane reformation prior to the fuel entering the fuel cell stack thereby increasing on cell reforming (i.e., reforming of methane to hydrogen, carbon monoxide, and carbon dioxide at the fuel cell itself) which may allow for reduced air flow through the fuel cell system, less back pressure and less volume air flow, and less parasitic loss from a main air blower. Additionally, the combination of the benefits of an annular pre-reformer may increase hot box lifetime.

In the various embodiments, the fuel inlet stream may include higher hydrocarbons with or without additional methane. As discussed herein, higher hydrocarbons in the fuel inlet stream may include, hydrocarbons including more carbon atoms than methane, such as ethane, ethene, propane, propene, butane, pentane, isopentane, hexane, etc. Fuels including higher hydrocarbons may include diesel fuel, (including low sulfur diesel and ultra low sulfur diesel), jet fuel (including JP-5 and JP-8 jet fuels), kerosene (including low sulfur kerosene and ultralow sulfur kerosene), natural gas, peak shave natural gas with high propane and high air content, peak shave natural gas with lower propane and lower air content, natural gas with injected refinery gases, natural gas with a high ethane and propane content, natural gas with medium ethane and propane content, other logistics fuels, etc. Example fuels including higher hydrocarbons may be comprised of a combination of various molecules including CO, $CO_2$, $H_2O$, $H_2$, $O_2$, $N_2$, Ar, $CH_4$, $C_2H_6$, $C_2H_4$, $C_3H_8$, $C_3H_6$, n-$C_4H_{10}$ (n-butane), i-$C_4H_{10}$ (isobutane), $C_5H_{12}$, and $C_6H_{14}$ and the various molecules may represent different molecular fractions (or percentages) of the overall fuel. As examples, $CH_4$ may comprise from less than 96% of the molecules in the fuel in the fuel inlet stream, e.g., 40.496% to 95.994% of the molecules, $C_2H_6$ may comprise from 1.250% and 8.00% of the molecules in the fuel in the fuel inlet stream, $C_2H_4$ may comprise from 0.040% to 8.00% of the molecules in the fuel in the fuel inlet stream, $C_3H_8$ may comprise from 0.360% to 30.760% of the molecules in the fuel in the fuel inlet stream, $C_3H_6$ may comprise from 0.001% to 1.620% of the molecules in the fuel in the fuel inlet stream, n-$C_4H_{10}$ may comprise from 0.001% to 0.400% of the molecules in the fuel in the fuel inlet stream, i-$C_4H_{10}$ may comprise from 0.001% to 0.200% of the molecules in the fuel in the fuel inlet stream, $C_5H_{12}$ may comprise from 0.001% to 0.090% of the molecules in the fuel in the fuel inlet stream, and $C_6H_{14}$ may comprise from 0.001% to 0.030% of the molecules in the fuel in the fuel inlet stream. Six exemplary fuel compositions are shown in Table I below.

TABLE I

| Mole Fraction | Natural Gas (from PG&E) | Peak Shave Natural Gas High Propane, High Air | Peak Shave Natural Gas Lower Propane, Lower Air | Natural Gas Injected with Refinery Gases | Natural Gas with higher Ethane and Propane High Ethane | Natural Gas with higher Ethane and Propane Medium Ethane |
|---|---|---|---|---|---|---|
| CO | 0.001% | 0.001% | 0.001% | 0.001% | 0.001% | 0.001% |
| CO2 | 1.300% | 0.300% | 0.360% | 4.000% | 1.300% | 2.200% |
| H2O | 0.001% | 0.001% | 0.001% | 0.001% | 0.001% | 0.001% |
| H2 | 0.001% | 0.001% | 0.001% | 2.000% | 0.001% | 0.001% |
| O2 | 0.001% | 5.300% | 4.280% | 0.001% | 0.001% | 0.001% |
| N2 | 0.400% | 20.040% | 16.200% | 0.001% | 0.400% | 0.400% |
| Ar | 0.001% | 0.001% | 0.001% | 0.001% | 0.001% | 0.001% |
| CH4 | 95.994% | 40.496% | 48.946% | 74.991% | 84.114% | 88.102% |
| C2H6 | 1.760% | 1.250% | 1.550% | 8.000% | 8.000% | 6.500% |
| C2H4 | 0.001% | 0.060% | 0.040% | 8.000% | 0.001% | 0.001% |
| C3H8 | 0.360% | 30.760% | 27.910% | 1.000% | 6.000% | 2.100% |
| C3H6 | 0.001% | 1.620% | 0.500% | 2.000% | 0.001% | 0.001% |
| n-C4H10 | 0.020% | 0.050% | 0.060% | 0.001% | 0.020% | 0.400% |
| i-C4H10 | 0.070% | 0.050% | 0.060% | 0.001% | 0.070% | 0.200% |
| C5H12 | 0.088% | 0.040% | 0.060% | 0.001% | 0.088% | 0.090% |
| C6H14 | 0.001% | 0.030% | 0.030% | 0.001% | 0.001% | 0.001% |

Figure 10:
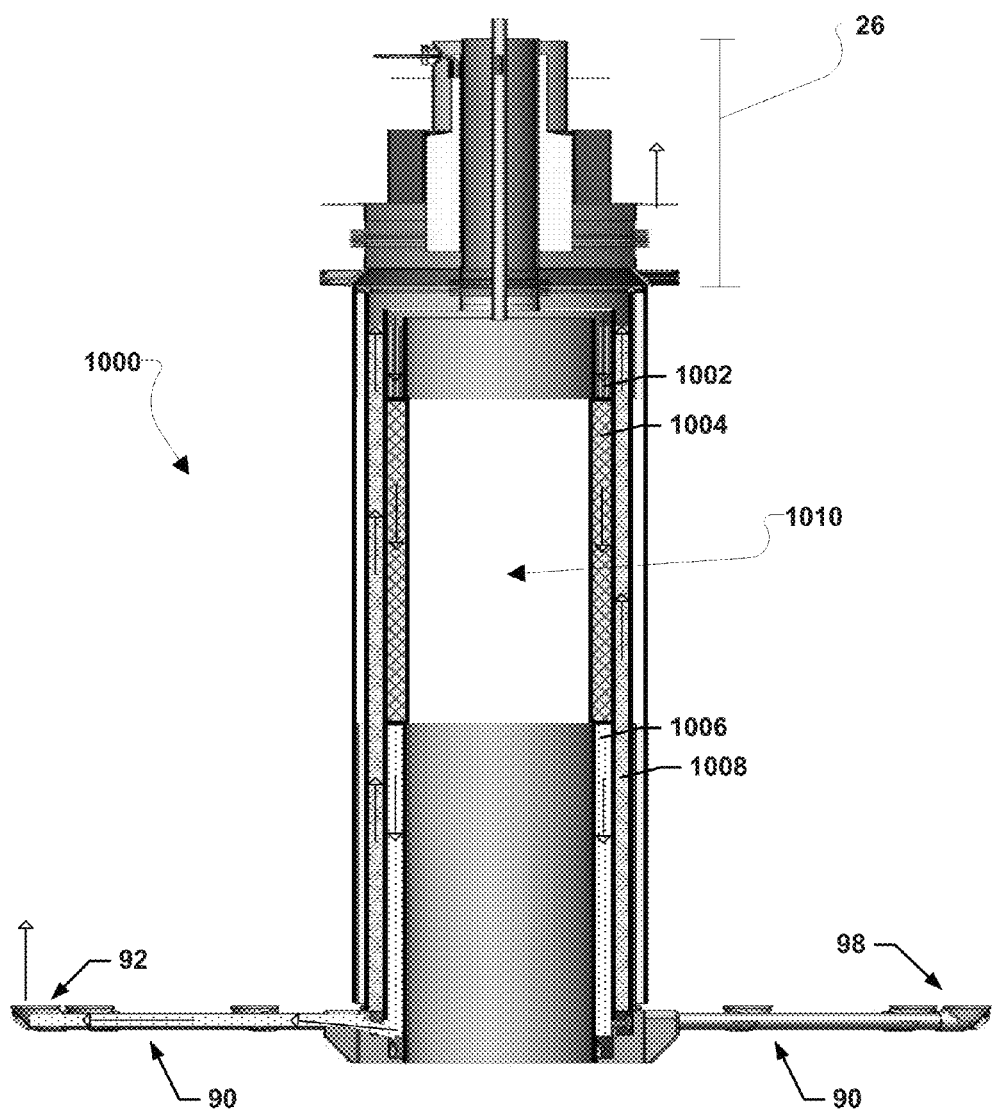
FIG. 10 is a side cross sectional view of an anode recuperator according to an embodiment.

FIG. 10 illustrates a side cross sectional view an anode recuperator 1000 according to an embodiment. The anode recuperator 1000 may be an anode recuperator of a solid oxide fuel cell system. The anode recuperator 1000 may include an annular fuel passage 1002 coupled to an annular pre-reformer 1004 and in fluid communication with the annular pre-reformer 1004. The annular pre-reformer 1004 may be configured to receive an unreformed fuel stream from the first annular fuel passage 1002. The annular pre-reformer 1004 may be an annular passage which may support a pre-reformer catalyst, such as nickel and/or rhodium, along a length of the annular pre-reformer 1004, and may reform the fuel stream received from the annular fuel passage 1002 to generate a reformed fuel stream. The annular pre-reformer 1004 may be coupled to a second annular fuel passage 1006 and in fluid communication with the second annular fuel passage 1006. The second annular fuel passage 1006 may be configured to receive the reformed fuel stream from the annular pre-reformer 1004. In an embodiment, the first annular fuel passage 1002, annular pre-reformer 1004, and second annular fuel passage 1006 may be one annular passage except that the annular pre-reformer portion 1004 may contain catalyst. An annular anode exhaust passage 1008 may surround at least a portion of the first annular fuel passage 1002, the annular pre-reformer 1004, and the second annular fuel passage 1006. The annular anode exhaust passage 1008 may be thermally coupled to at least the first annular fuel passage 1002, the passage 1004 of the pre-reformer, and the second annular fuel passage 1006 such that an anode exhaust stream in the anode exhaust passage 1008 may provide heat to the unreformed fuel stream in the first annular fuel passage 1002, the passage 1004 of the pre-reformer, and the reformed fuel stream in the second annular fuel passage 1006. In an embodiment, the catalyst or catalyst support in the annular pre-reformer 1004 may be in direct contact with an inner wall of the anode exhaust passage 1008. For example, the catalyst or catalyst support in the annular pre-reformer 1004 may rest against the anode exhaust passage 1008 and/or be brazed to the anode exhaust passage 1008. In an embodiment, an inner wall of the first annular fuel passage 1002 may be configured to form a plenum surrounded by the first annular fuel passage 1002, the second annular fuel passage 1006 may be configured to form a plenum surrounded by the second annular fuel passage 1006, and the annular pre-reformer 1004 may be configured to form a plenum surrounded by the inner wall of the annular pre-reformer 1004. The three plenums may be in fluid communication, thereby forming a central plenum 1010 having an upper plenum portion surrounded by the first annular fuel passage 1002, a pre-reformer plenum portion surrounded by the annular pre-reformer 1004, and a lower plenum portion surrounded by the second annular fuel passage 1006.

Figure 11A:
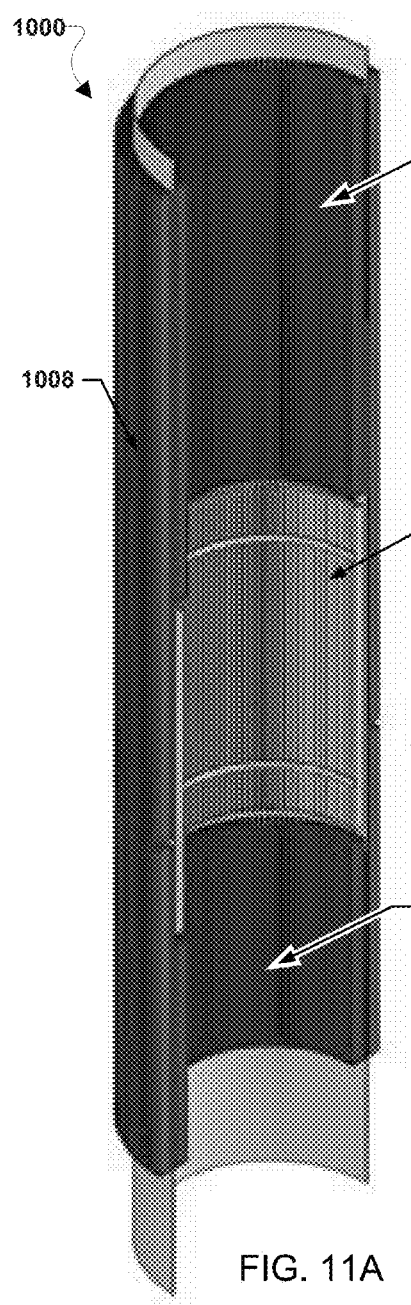
FIG. 11A is a perspective cross sectional view of the anode recuperator illustrated in FIG. 10.

FIG. 11A illustrates a perspective cross sectional view of the anode recuperator 1000 described above with reference to FIG. 10. In an embodiment, the annular pre-reformer 1004 may be a finned pre-reformer. In an embodiment, the first annular fuel passage 1002 and second annular fuel passage 1006 may be a continuous annular passage containing a set of catalyst coated fins inserted in the middle which function as the pre-reformer. While illustrated as a finned pre-reformer and finned fuel passages in various figures, the annular pre-reformer 1004 may have other configurations which may not incorporate fins. In another embodiment, the annular pre-reformer 1004 may be disposed in a gap between the first annular fuel passage 1002 and the second annular fuel passage 1006 if the passages 1002 and 1006 do not form one continuous passage.

Figure 11B:
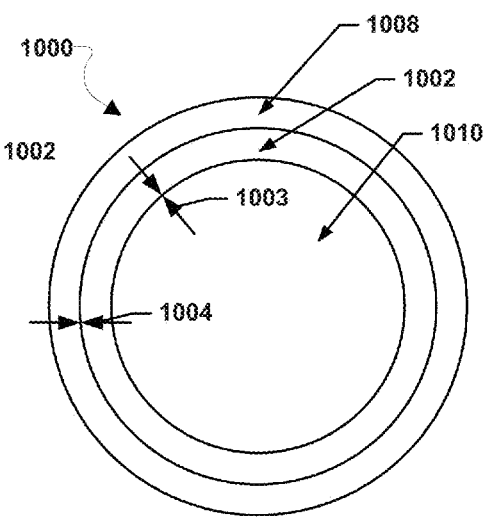
FIG. 11B is a top cross sectional view of the anode recuperator illustrated in FIG. 10.

FIG. 11B illustrates a top cross sectional view of another embodiment of the anode recuperator 1000 shown in FIG. 10. FIG. 11B illustrates that the annular anode exhaust passage 1008 surrounds (i.e., encircles) the first annular fuel passage 1002 and second annular fuel passage 1006 (not visible in FIG. 11B). In an embodiment, the inner wall 1003 of the first annular fuel passage 1002 may be configured to form an upper portion of the plenum 1010. In this manner, the first annular fuel passage 1002 may surround (i.e., encircle) the upper portion of the plenum 1010. While not visible in FIG. 11B, in a similar manner an inner wall of the second annular fuel passage 1006 may be configured to form a lower portion of the plenum 1010. The annular pre-reformer 1004 may be configured as a common wall having its inner surface coated with catalyst located between and separating the first annular fuel passage 1002 and the annular anode exhaust passage 1008.

Figure 11C:
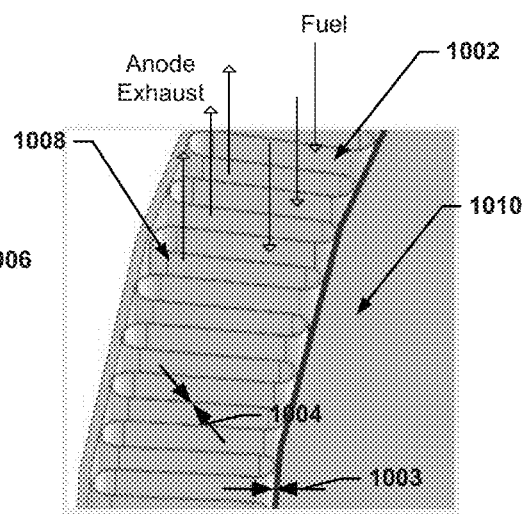
FIG. 11C another top cross sectional view of the anode recuperator illustrated in FIG. 10.

FIG. 11C illustrates another top cross sectional view of another embodiment of the anode recuperator 1000 shown in FIG. 10. As illustrated in FIG. 11C, the common wall 1004 between the first annular fuel passage 1002 and the annular anode exhaust passage 1008 may be a catalyst coated corrugated fin with anode exhaust flowing vertically up through the annular anode exhaust passage 1008 and fuel flowing vertically down through the first annular fuel passage 1002. The anode exhaust flowing in the annular anode exhaust passage 1008 may provide heat to the first annular fuel passage 1002, the annular pre-reformer 1004, and/or the second annular fuel passage 1006, and any fuel flows therein.

Figure 12:
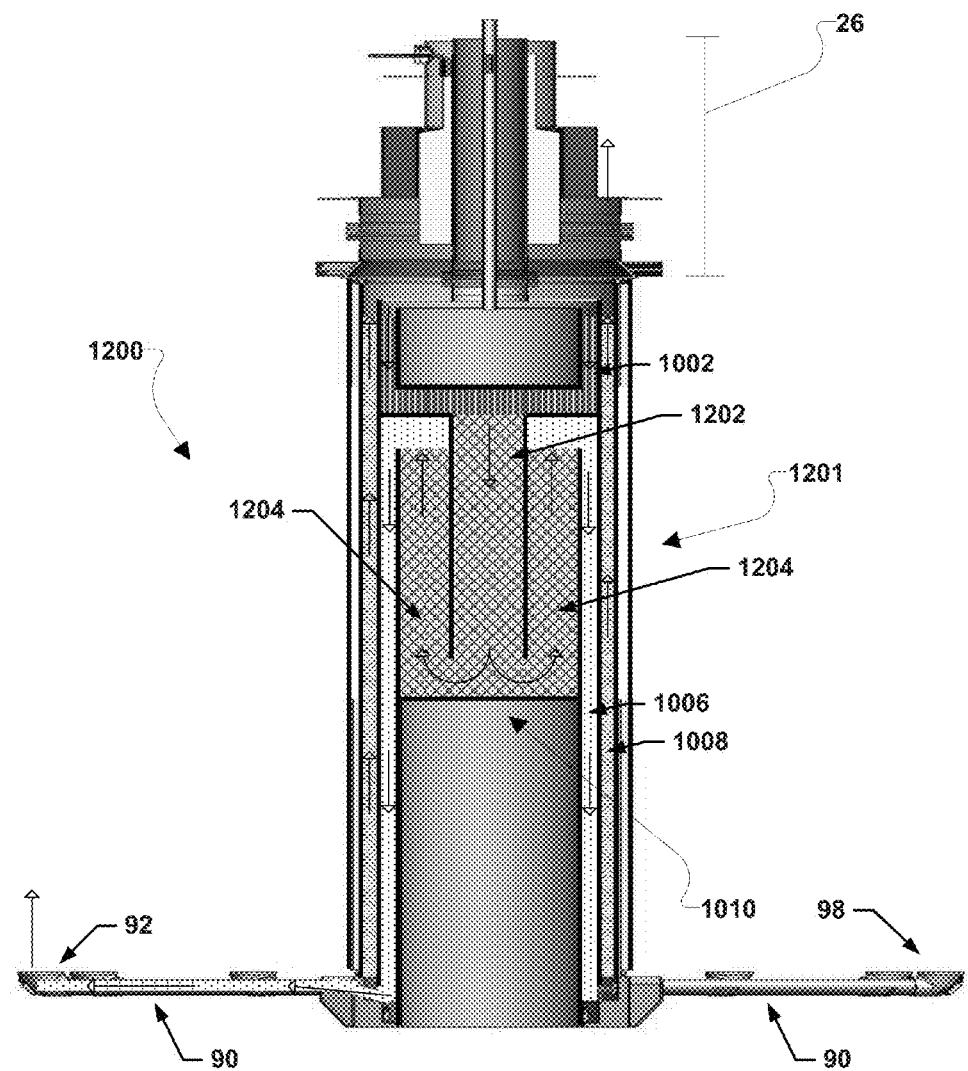
FIG. 12 is a side cross sectional view of an anode recuperator according to a second embodiment.

FIG. 12 illustrates a side cross sectional view of an embodiment anode recuperator 1200. Anode recuperator 1200 is similar to anode recuperator 1000 illustrated in FIG. 10 and contains a number of components in common. Those components which are common to both anode recuperators 1000 and 1200 are numbered the same in FIGS. 10 and 12 and will not be described further.

One difference between anode recuperators 1000 and 1200 is that the annular pre-reformer 1201 of the anode recuperator 1200 may be located within the central plenum 1010 of the anode recuperator 1200 and separated from an inner wall of the annular anode exhaust passage 1008 by the first annular fuel passage 1002 and/or the second annular fuel passage 1006, and the annular pre-reformer 1201 may fill the central plenum 1010 such that the upper portion of the central plenum 1010 formed by the first annular fuel passage 1002 may not be in fluid communication with the lower portion of the central plenum 1010 formed by the second annular fuel passage 1006. The annular pre-reformer 1201 may be located axially inward of the first annular fuel passage 1002 and/or the second annular fuel passage 1006 and the annular pre-reformer 1201 may be separated from the annular anode exhaust passage 1008 by the first annular fuel passage 1002 and/or the second annular fuel passage 1006. The annular pre-reformer 1201 may include a first annular pre-reforming passage 1204 and a second annular pre-reforming passage 1202. The first annular pre-reforming passage 1204 may encircle the second annular pre-reforming passage 1202. The second annular pre-reforming passage 1202 may be configured to received the unreformed fuel stream from the first annular fuel passage 1002 and the first annular pre-reforming passage 1204 may be configured to provide the reformed fuel stream to the second annular fuel passage 1006. In this manner, an unreformed fuel stream may flow radially inward from the first annular fuel passage 1002 at the top of the annular pre-reformer 1201, flow axially down the annular pre-reformer 1201 via the second annular pre-reforming passage 1202, flow radially to the outside of the annular pre-reformer 1201 and be directed axially back up the first annular pre-reforming passage 1204 to then flow radially to the second annular fuel passage 1006 and then flow axially down passage 1006. In an embodiment, pre-reformer catalyst may be located (e.g., supported) in both the first annular pre-reforming passage 1204 and the second annular pre-reforming passage 1202. The pre-reformer catalyst may be supported in the first annular pre-reforming passage 1202 and/or the second annular pre-reforming passage 1204 using any type structure, such as catalyst coated fins, catalyst supporting foam, catalyst coated twisted wires, etc.

Figure 13:
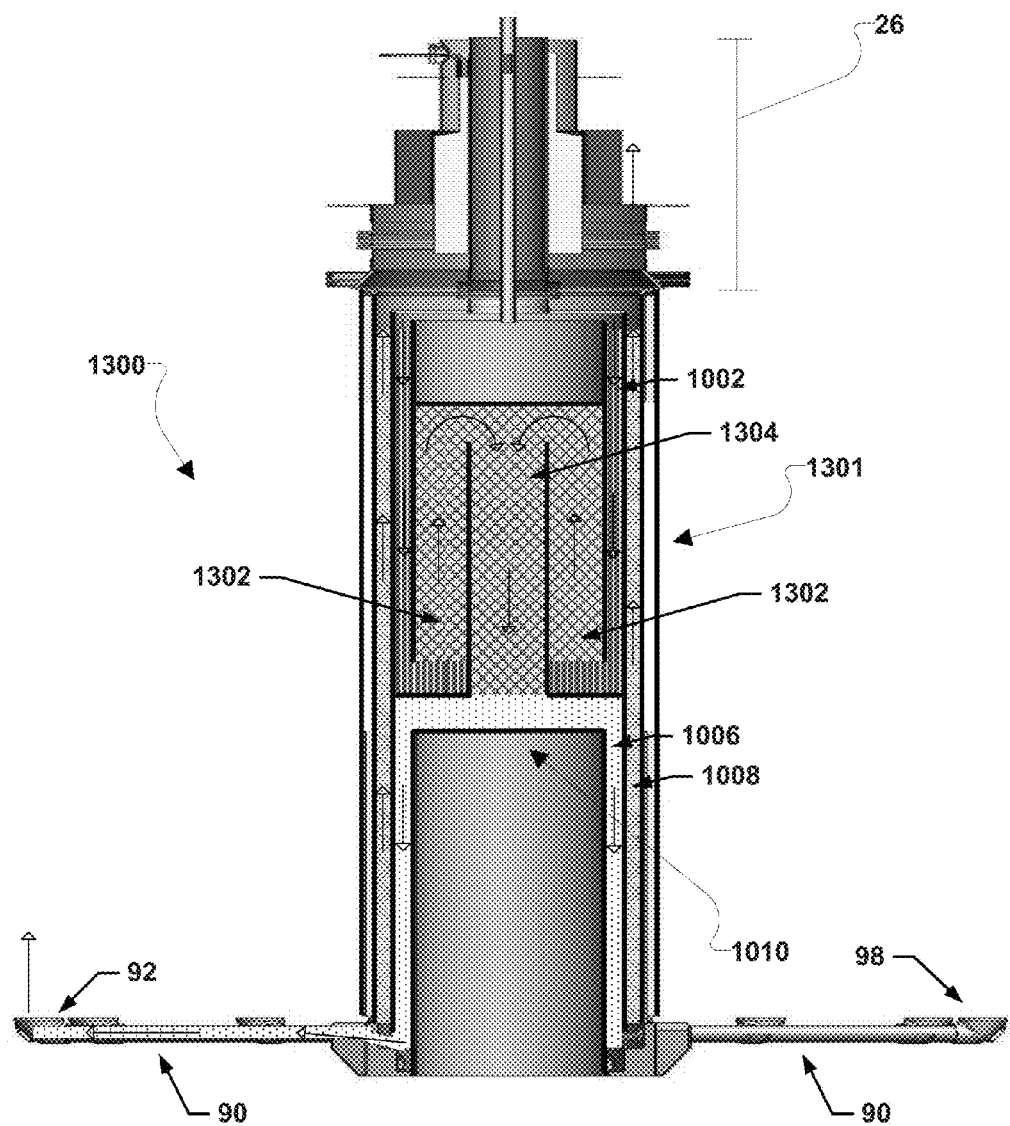
FIG. 13 is a side cross sectional view of an anode recuperator according to a third embodiment.

FIG. 13 illustrates a side cross sectional view of an embodiment anode recuperator 1300. Anode recuperator 1300 is similar to anode recuperator 1200 illustrated in FIG. 12 and contains a number of components in common. Those components which are common to both anode recuperators 1200 and 1300 are numbered the same in FIGS. 12 and 13 and will not be described further.

One difference between anode recuperators 1200 and 1300 is that the annular pre-reformer 1301 of the anode recuperator 1300 is that the axial flow directions of the fuel are reversed. The annular pre-reformer 1301 may include a first annular pre-reforming passage 1302 and a second annular pre-reforming passage 1304. The first annular pre-reforming passage 1302 may encircle the second annular pre-reforming passage 1304. The first annular pre-reforming passage 1302 may be configured to receive the unreformed fuel stream from the first annular fuel passage 1002 and the second annular pre-reforming passage 1304 may be configured to provide the reformed fuel stream to the second annular fuel passage 1006. In this manner, an unreformed fuel stream may flow radially inward to enter the outer portion of the annular pre-reformer 1301 from the first annular fuel passage 1002 at the bottom of the annular pre-reformer 1301, flow axially up the outer portion of annular pre-reformer 1301 via the first annular pre-reforming passage 1302, flow radially inward to the center of the annular pre-reformer 1301 and be directed back axially down the second annular pre-reforming passage 1304 to flow radially outward to the second annular fuel passage 1006. In an embodiment, pre-reformer catalyst may be located (e.g., supported) in both the first annular pre-reforming passage 1302 and the second annular pre-reforming passage 1304. The pre-reformer catalyst may be supported in the first annular pre-reforming passage 1302 and/or the second annular pre-reforming passage 1304 using any type structure, such as catalyst coated fins, catalyst supporting foam, catalyst coated twisted wires, etc.

Figure 14:
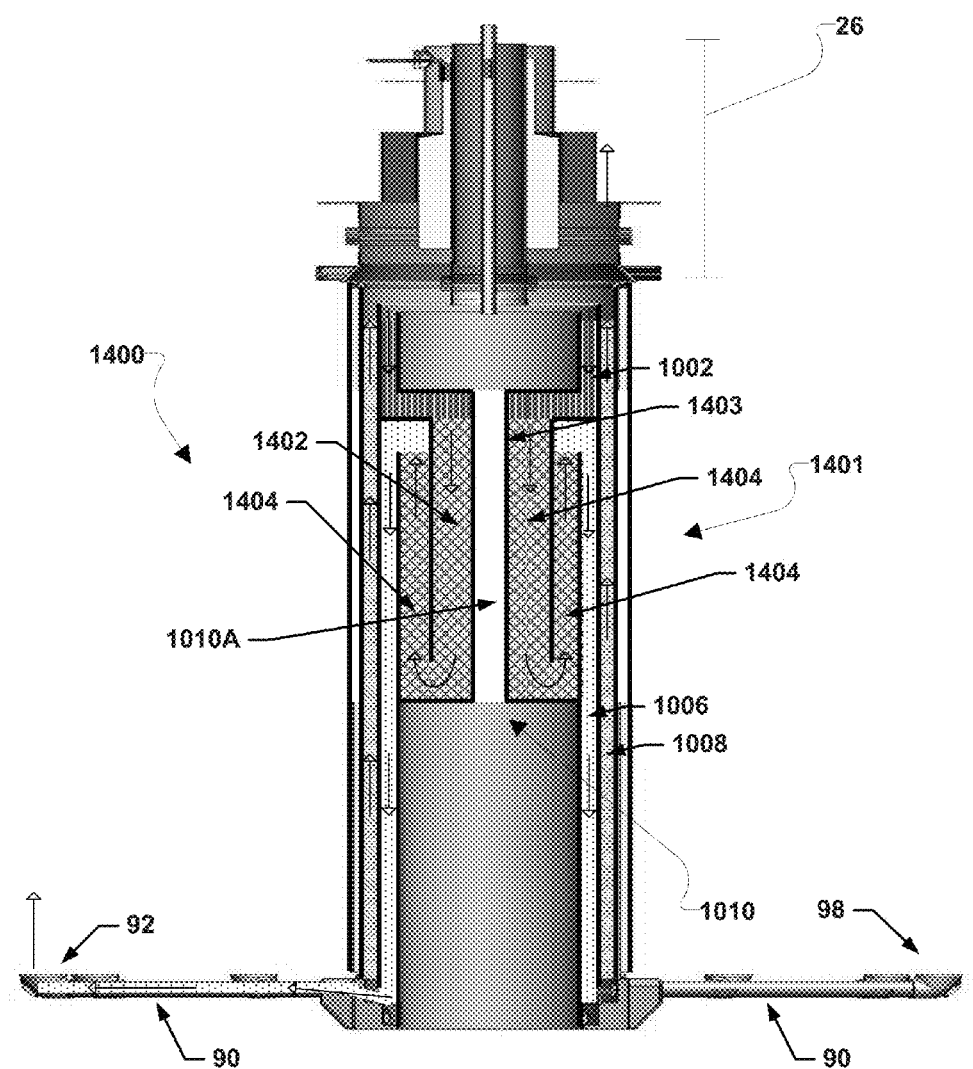
FIG. 14 is a side cross sectional view of an anode recuperator according to a fourth embodiment.

FIG. 14 illustrates a side cross sectional view of an embodiment anode recuperator 1400. Anode recuperator 1400 is similar to anode recuperator 1200 illustrated in FIG. 12 and contains a number of components in common. Those components which are common to both anode recuperators 1200 and 1400 are numbered the same in FIGS. 12 and 14 and will not be described further.

One difference between anode recuperators 1000 and 1400 is that the annular pre-reformer 1401 of the anode recuperator 1400 only partially fills the plenum 1010. The annular pre-reformer 1401 may include a first annular pre-reforming passage 1404 and a second annular pre-reforming passage 1402. The first annular pre-reforming passage 1404 may encircle the second annular pre-reforming passage 1402. The second annular pre-reforming passage 1402 contains an inner wall 1403 which encircles a hollow portion 1010A of the plenum 1010 which is not filled with catalyst. The second annular pre-reforming passage 1402 is configured to receive the unreformed fuel stream from the first annular fuel passage 1002 and the first annular pre-reforming passage 1404 may be configured to provide the reformed fuel stream to the second annular fuel passage 1006. In this manner, an unreformed fuel stream may flow radially inward from the first annular fuel passage 1002 and be directed axially down to enter the central ring of the annular pre-reformer 1401 at the top of the annular pre-reformer 1401, flow axially down the annular pre-reformer 1401 via the second annular pre-reforming passage 1402, flow radially to the outside of the annular pre-reformer 1401 and be directed to flow axially back up the first annular pre-reforming passage 1404 to the second annular fuel passage 1006 to then be directed radially out and then directed axially downward to flow axially downward through the second annular fuel passage 1006. In an embodiment, pre-reformer catalyst may be located (e.g., supported) in both the first annular pre-reforming passage 1404 and the second annular pre-reforming passage 1402. The pre-reformer catalyst may be supported in the first annular pre-reforming passage 1404 and/or the second annular pre-reforming passage 1402 using any type structure, such as catalyst coated fins, catalyst supporting foam, catalyst coated twisted wires, etc.

Figure 15:
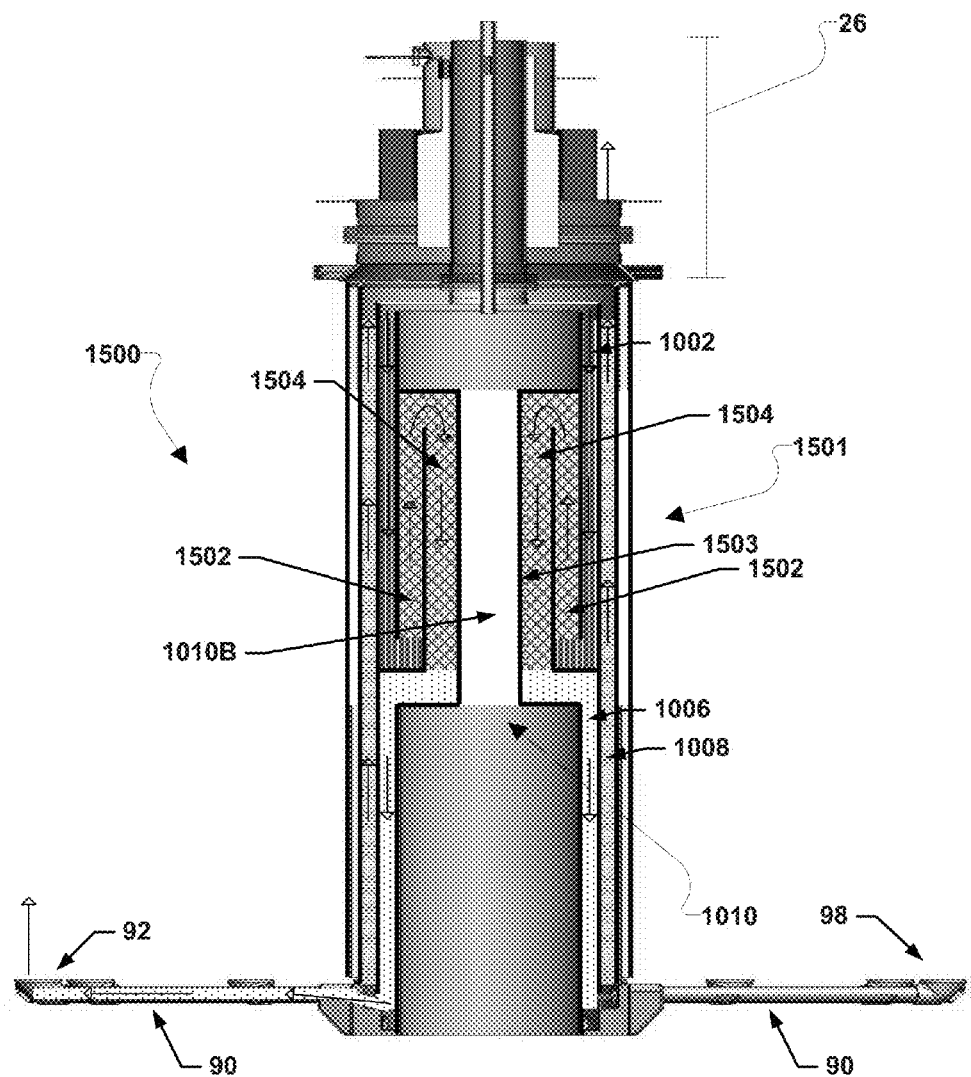
FIG. 15 is a side cross sectional view of an anode recuperator according to a fifth embodiment.

FIG. 15 illustrates a side cross sectional view of an embodiment anode recuperator 1500. Anode recuperator 1500 is similar to anode recuperator 1400 illustrated in FIG. 14 and contains a number of components in common. Those components which are common to both anode recuperators 1400 and 1500 are numbered the same in FIGS. 14 and 15 and will not be described further.

One difference between anode recuperators 1400 and 1500 is that the axial flow directions of the fuel are reversed. The annular pre-reformer 1501 may include a first annular pre-reforming passage 1502 and a second annular pre-reforming passage 1504. The first annular pre-reforming passage 1502 may encircle the second annular pre-reforming passage 1504. The second annular pre-reforming passage 1504 contains an inner wall 1503 which encircles a hollow portion 1010B of the plenum 1010 which is not filled with catalyst. The first annular pre-reforming passage 1502 may be configured to receive the unreformed fuel stream from the first annular fuel passage 1002 and the second annular pre-reforming passage 1504 may be configured to provide the reformed fuel stream to the second annular fuel passage 1006. In this manner, an unreformed fuel stream may flow radially inward from the first annular fuel passage 1002 and be directed axially up into the outer portion of the annular pre-reformer 1501 at the bottom of the annular pre-reformer 1501, flow axially up the outer portion of annular pre-reformer 1501 via the first annular pre-reforming passage 1502, be directed radially inward to flow into the inner ring of the annular pre-reformer 1501 then be directed to flow axially back down the second annular pre-reforming passage 1504 to the second annular fuel passage 1006 and flow radially outward and then flow axially down the second annular fuel passage 1006. In an embodiment, pre-reformer catalyst may be located (e.g., supported) in both the first annular pre-reforming passage 1502 and the second annular pre-reforming passage 1504. The pre-reformer catalyst may be supported in the first annular pre-reforming passage 1502 and/or the second annular pre-reforming passage 1504 using any type structure, such as catalyst coated fins, catalyst supporting foam, catalyst coated twisted wires, etc.

Figure 16:
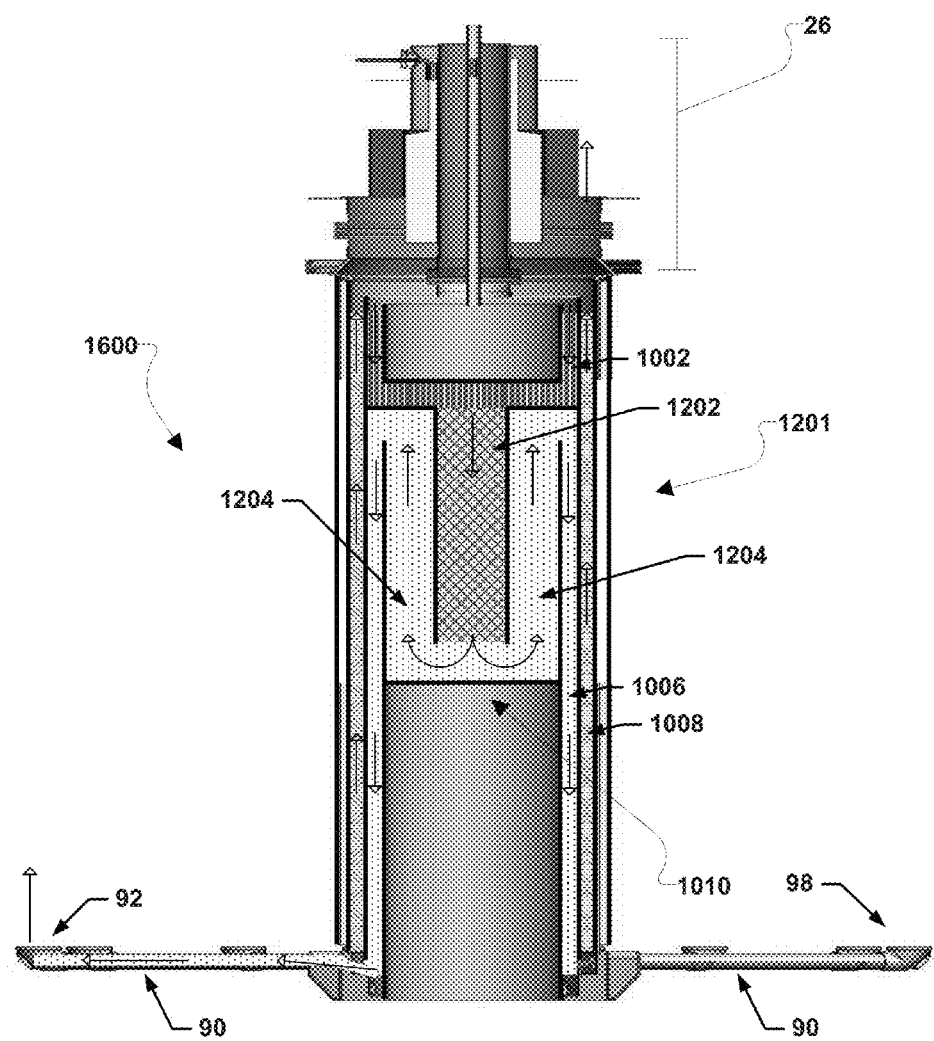
FIG. 16 is a side cross sectional view of an anode recuperator according to a sixth embodiment.

FIG. 16 illustrates a side cross sectional view of an embodiment anode recuperator 1600. Anode recuperator 1600 is similar to anode recuperator 1200 illustrated in FIG. 12 and contains a number of components in common. Those components which are common to both anode recuperators 1200 and 1600 are numbered the same in FIGS. 12 and 16 and will not be described further.

One difference between anode recuperators 1200 and 1600 is that the annular pre-reformer 1201 of the anode recuperator 1600 may only include pre-reformer catalyst in the second annular pre-reforming passage 1202. The pre-reformer catalyst may be supported in the second annular pre-reforming passage 1202 using any type structure, such as catalyst coated fins, catalyst supporting foam, catalyst coated twisted wires, etc. Pre-reformer catalyst may not be located (e.g., supported) in the first annular passage 1204 which may be empty. In this manner, pre-reforming of fuel may not occur in the first annular passage 1204. This allows the temperature in pre-reformer 1201 to be maintained at a low level, such as at 350-450 degrees Celsius, because passage 1202 containing catalyst is separated from the anode exhaust in passage 1008 by passages 1006 and 1204.

Figure 17:
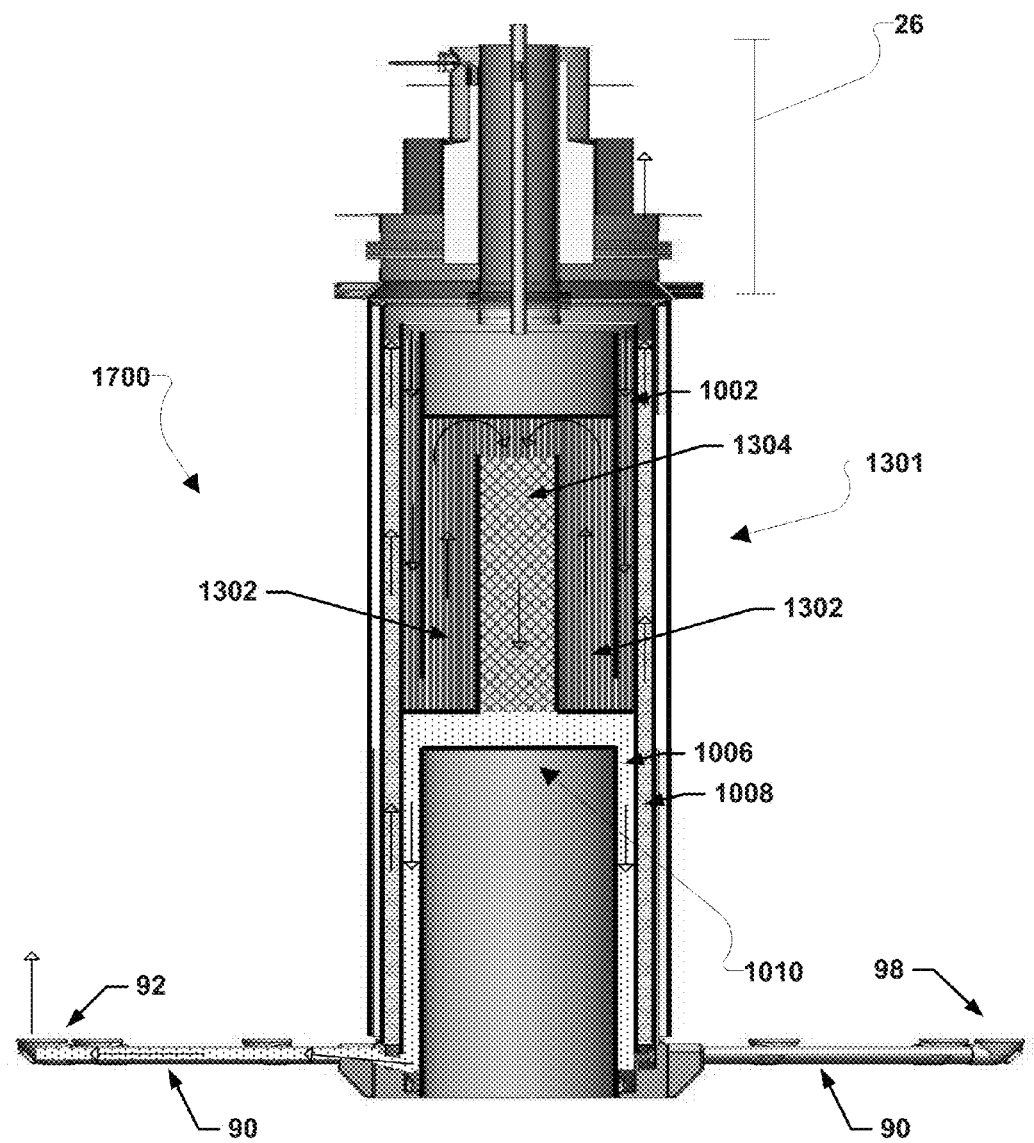
FIG. 17 is a side cross sectional view of an anode recuperator according to a seventh embodiment.

FIG. 17 illustrates a side cross sectional view of an embodiment anode recuperator 1700. Anode recuperator 1700 is similar to anode recuperator 1300 illustrated in FIG. 13 and contains a number of components in common. Those components which are common to both anode recuperators 1300 and 1700 are numbered the same in FIGS. 13 and 17 and will not be described further.

One difference between anode recuperators 1300 and 1700 is that the annular pre-reformer 1301 of the anode recuperator 1700 may only include pre-reformer catalyst in the second annular pre-reforming passage 1304. The pre-reformer catalyst may be supported in the second annular pre-reforming passage 1304 using any type structure, such as catalyst coated fins, catalyst supporting foam, catalyst coated twisted wires, etc. Pre-reformer catalyst may not be located (e.g., supported) in the first annular passage 1302 which may be empty. In this manner, pre-reforming of fuel may not occur in the first annular passage 1302. This allows the temperature in pre-reformer 1301 to be maintained at a low level, such as at 350-450 degrees Celsius, because passage 1304 containing catalyst is separated from the anode exhaust in passage 1008 by passages 1002 and 1302.

Figure 18A:
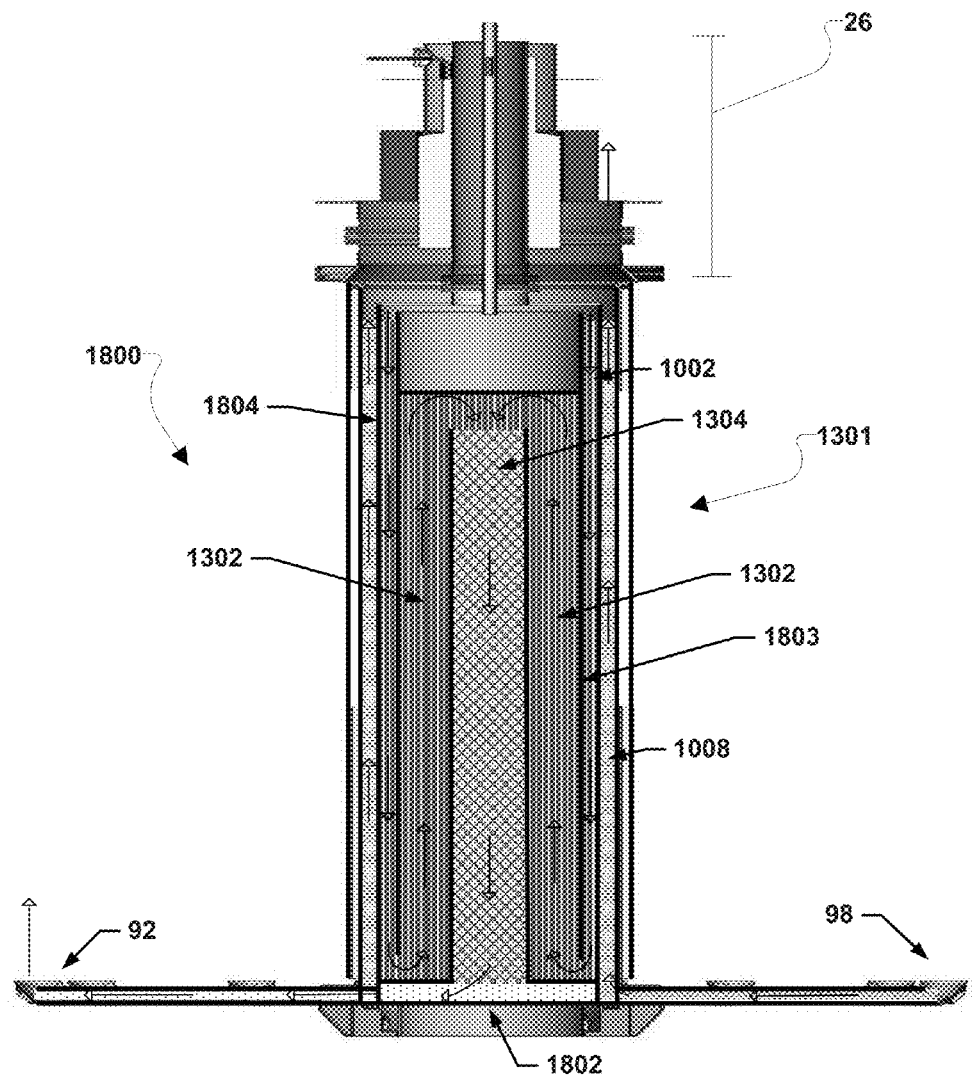
FIG. 18A is a side cross sectional view of an anode recuperator according to an eighth embodiment.

FIG. 18A illustrates a side cross sectional view of an embodiment anode recuperator 1800. Anode recuperator 1800 is similar to anode recuperator 1700 illustrated in FIG. 17 and contains a number of components in common. Those components which are common to both anode recuperators 1700 and 1800 are numbered the same in FIGS. 17 and 18A and will not be described further.

One difference between anode recuperators 1700 and 1800 is that there is no second annular fuel passage 1006 in anode recuperator 1800. Thus, the first annular pre-reformer passage 1302 and second annular pre-reformer passage 1304 may occupy the plenum 1010 such that the reformed fuel stream does not flow to contact the inner wall 1804 of the anode exhaust passage 1008. An inner wall 1803 of the first annular fuel passage 1002 may separate the first annular pre-reformer passage 1302 from the first annular fuel passage 1002. Pre-reformer catalyst may not be located (e.g., supported) in the first annular passage 1302 which may be empty. In this manner, pre-reforming of fuel may not occur in the first annular passage 1302. This allows the temperature of the region containing the pre-reformer 1301 to be maintained at a low level, such as below 675 degrees Celsius, for example at 350-450 degrees Celsius, because passage 1304 containing catalyst is separated from the anode exhaust in passage 1008 by passages 1002 and 1302. In another embodiment, the unreformed fuel stream entering the annular pre-reformer 1301 in the single stage anode recuperator 1800 illustrated in FIG. 18A may be hotter than the unreformed fuel streams entering the annular pre-reformers in the two stage anode recuperators 1000, 1200, 1300, 1400, 1500, 1600, and 1700 illustrated in FIGS. 10 and 12-17, respectively, because the unreformed fuel stream may travel a longer length of heat exchanger in the anode recuperator 1800. As an example, the temperature in the region of the system containing the annular pre-reformer 1301 illustrated in FIG. 18A may be maintained at 350-675, 350-500, 450-500 degrees Celsius, etc., and the unreformed fuel stream may be introduced to the annular pre-reformer 1301 illustrated in FIG. 18A from the first annular fuel passage 1002 at 600-750 degrees Celsius.

In annular pre-reformer 1800, the second annular pre-reformer passage 1304 discharges the reformed fuel stream directly to anode feed/return manifold 1802 which directs the reformed fuel stream to the fuel cell stacks via stack feed ports 92. The second annular pre-reformer passage 1304 may extend to the bottom of plenum 1010 and take up at least 75%, but less than 100% (e.g., 80-90%) of the axial length of the plenum 1010 to leave space at the top for fuel to enter. The anode feed/return manifold 1802 may also direct the anode exhaust stream from the anode exhaust ports 98 to the anode exhaust passage 1008. The direct discharge of the reformed fuel stream from the second annular pre-reformer passage 1304 to the anode feed/return assembly passage 1802 may limit the recuperation of heat in the reformed fuel stream when compared with the reformed fuel stream flowed into the second annular fuel passage 1006 as discussed above with reference to FIG. 17. This may allow the temperature in the anode feed/return assembly passage to be maintained at a low level, such as at 350-450 degrees Celsius, because the reformed fuel stream does not flow through a passage (e.g., 1002, 1006) in direct contact through a common wall with the anode exhaust passage 1008.

Figure 18B:
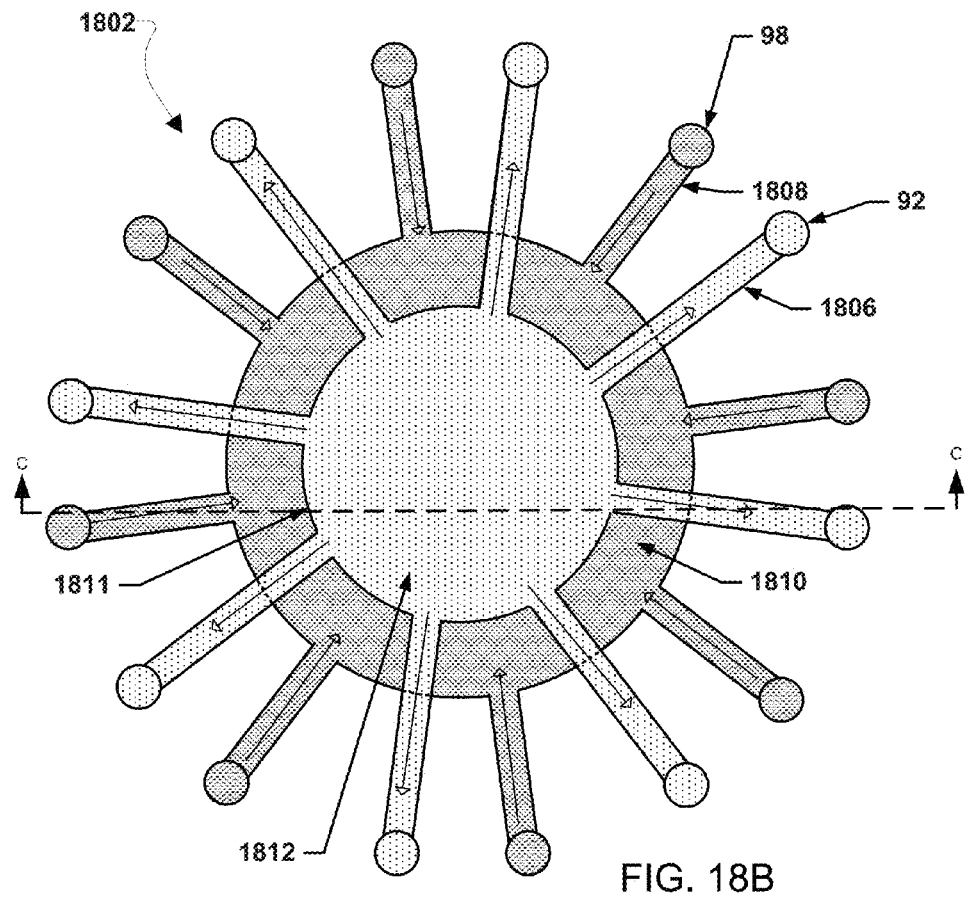
FIG. 18B is a top cross sectional view of an anode feed/return manifold suitable for use with the anode recuperator illustrated in FIG. 18A.
Figure 18C:
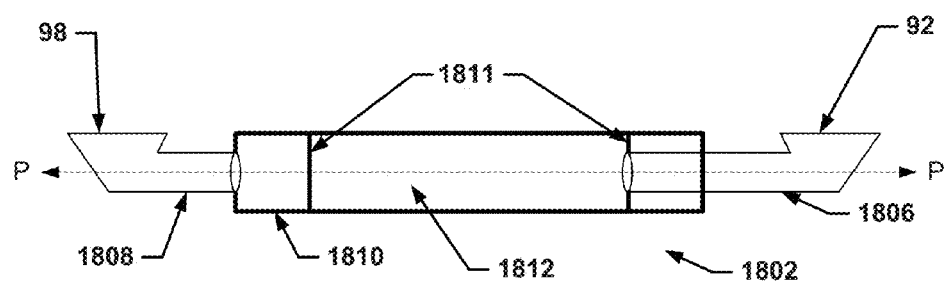
FIG. 18C is a side cross sectional view of the anode feed/return manifold illustrated in FIG. 18B.

FIG. 18B illustrates a top cross sectional view of the anode feed/return manifold 1802 and FIG. 18C illustrates a side cross sectional view of the anode feed/return manifold 1802 along line C-C in FIG. 18B. The anode feed/return manifold 1802 includes hollow cylindrical space 1812 surrounded by a concentric ring 1810 which is separated from the hollow cylindrical space 1812 by an inner wall 1811. Anode feed tubes 1806 extend from the hollow cylindrical space 1812 through the outer ring 1810 and connect to the stack feed ports 92. Anode exhaust tubes 1808 connect the anode exhaust ports 98 to the outer ring 1810 and open into the outer ring 1810. In an embodiment, the inner space 1812, outer ring 1810, anode feed tubes 1806, and anode exhaust tubes 1808 may all be aligned relative to the same plane P-P shown in FIG. 18C, such that FIG. 18B is a cross sectional view along this line P-P. In an embodiment, the anode feed tubes 1806 and/or the anode exhaust tubes 1808 may include bellows to relieve the stress of differential thermal expansion.

Figure 18D:
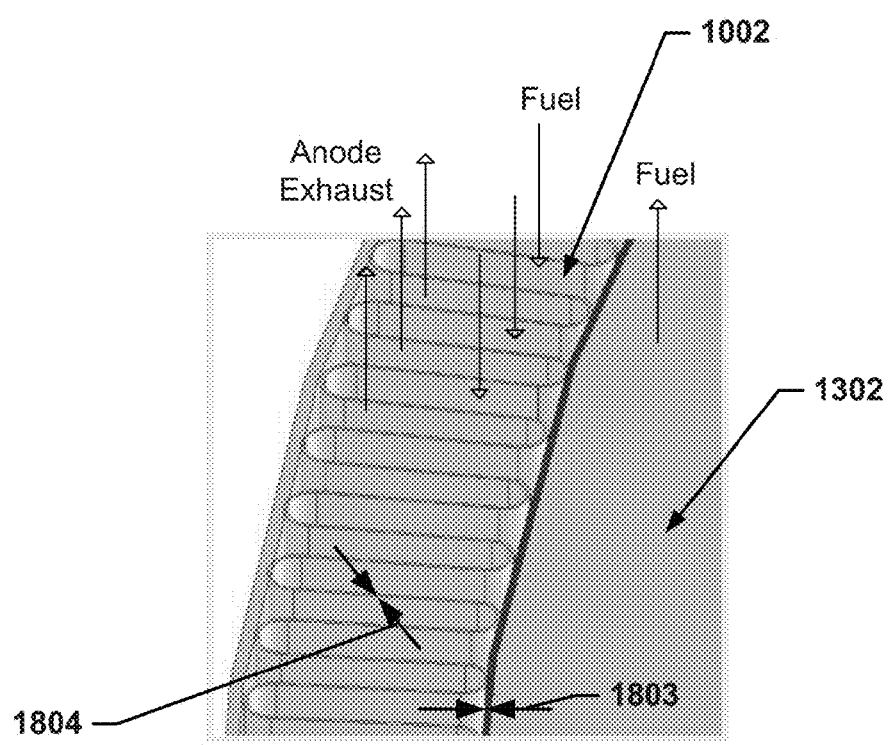
FIG. 18D is a top cross sectional view of the anode recuperator illustrated in FIG. 18A.

FIG. 18D illustrates a top cross sectional view of the anode recuperator 1800 shown in FIG. 18A. As illustrated in FIG. 18D, the common wall 1804 between the first annular fuel passage 1002 and the annular anode exhaust passage 1008 may be an annular corrugated finned wall with anode exhaust flowing vertically up through the annular anode exhaust passage 1008 and fuel flowing vertically down through the first annular fuel passage 1002 after entering grooves in the finned wall. The common wall 1803 between the first annular fuel passage 1002 and the first annular pre-reformer passage 1302 may not be corrugated. After flowing axially in from the first annular fuel passage 1002 into the first annular pre-reformer passage 1302, the fuel may flow vertically up through the first annular pre-reformer passage 1302, then axially into the second annular pre-reformer passage 1304, and then down vertically through the second annular pre-former passage 1304 into the anode feed/return manifold 1802.

Figure 19:
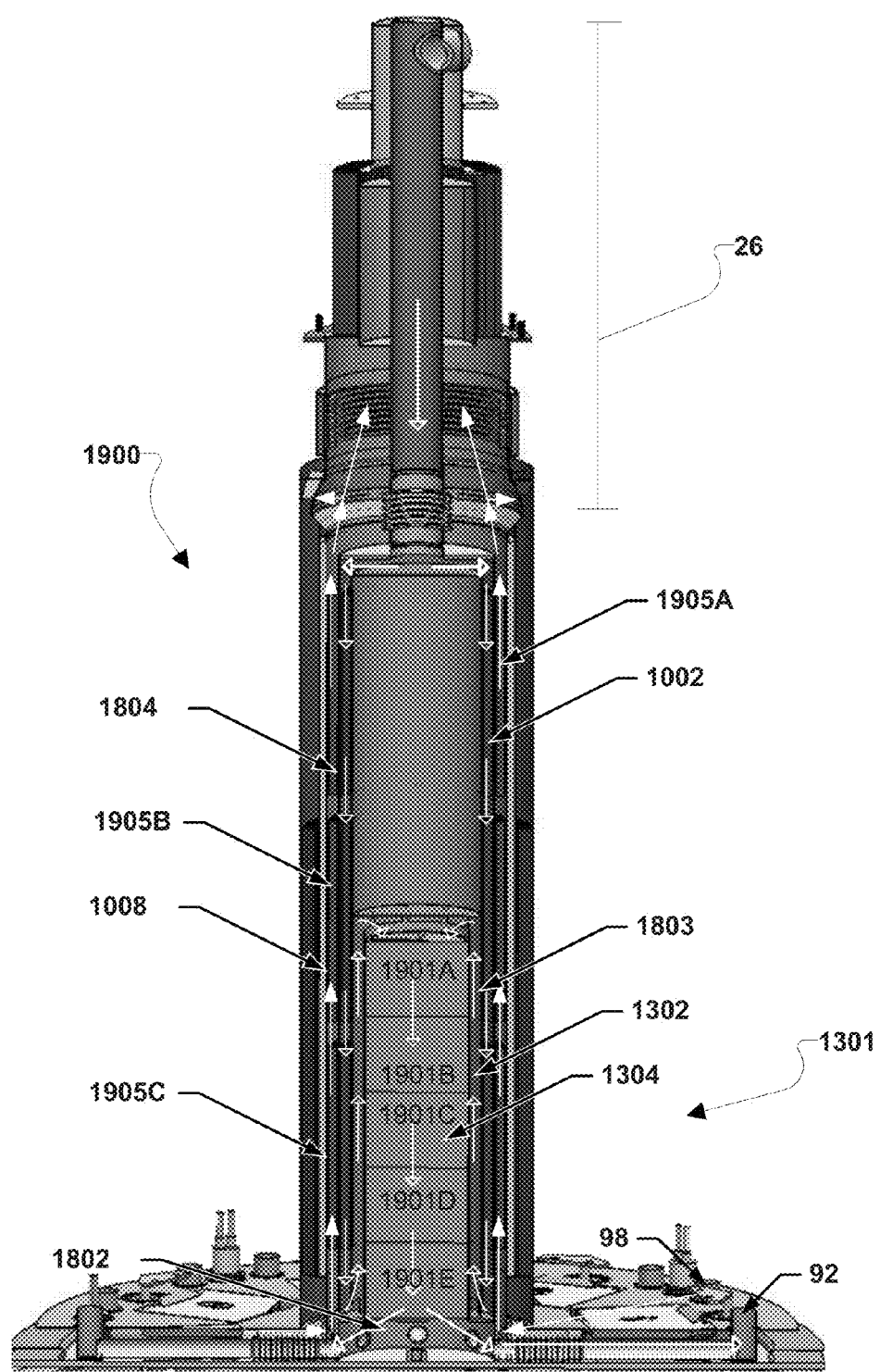
FIG. 19 is an isometric cross sectional view of an anode recuperator according to a ninth embodiment.

FIG. 19 illustrates an isometric cross sectional view of an embodiment anode recuperator 1900. Anode recuperator 1900 is similar to anode recuperator 1800 illustrated in FIG. 18A and contains a number of components in common. Those components which are common to both anode recuperators 1800 and 1900 are numbered the same in FIGS. 18A and 19 and will not be described further.

One difference between anode recuperators 1800 and 1900 is that the fins of the annular fuel passage 1002 and the annular anode exhaust passage 1008 may be separated into two or more distinct vertical segments, such as three segments 1905A, 1905B, and 1905C. In anode recuperator 1900, the pre-reformer catalyst may be supported in the second annular pre-reforming passage 1304 in one or more puck sections comprising pre-reforming catalyst, such as five puck sections 1901A, 1901B, 1901C, 1901D, and 1901E.

Figure 20:
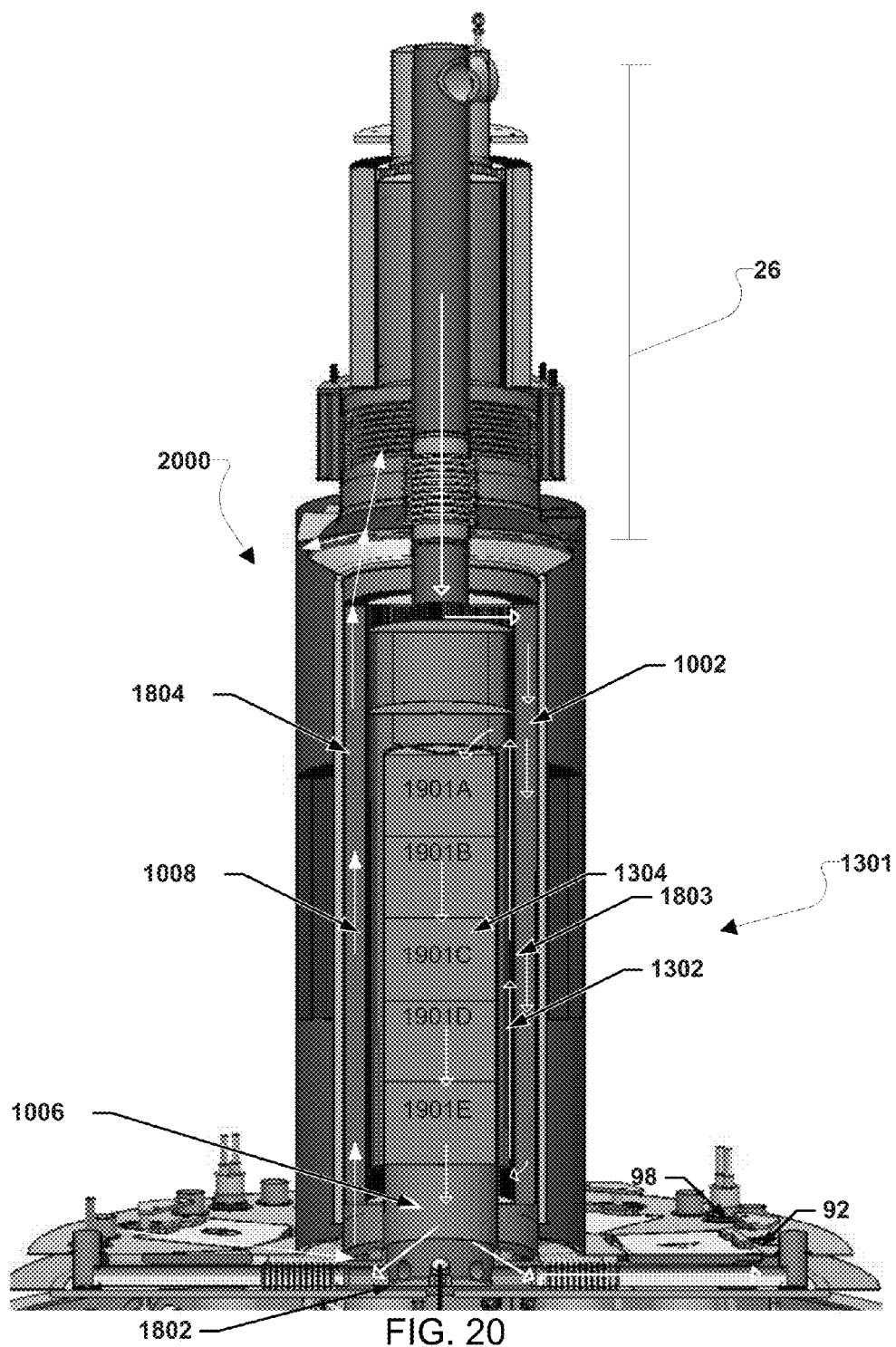
FIG. 20 is an isometric cross sectional view of an anode recuperator according to a tenth embodiment.

FIG. 20 illustrates an isometric cross sectional view of an embodiment anode recuperator 2000. Anode recuperator 2000 is similar to anode recuperator 1900 illustrated in FIG. 19 and contains a number of components in common. Those components which are common to both anode recuperators 1900 and 2000 are numbered the same in FIGS. 19 and 20 and will not be described further.

One difference between anode recuperators 1900 and 2000 is that the fins of the annular fuel passage 1002 and the annular anode exhaust passage 1008 are continuous along the entire length of the anode recuperator 2000. Furthermore, passages 1002 and 1008 are separated by single fin separator (i.e., single fin heat exchanger) in anode recuperator 2000, while the anode recuperator 1900 comprises a dual fin heat exchanger. Another difference between anode recuperators 1900 and 2000 is that the second annular pre-reforming passage 1304 does not connect directly to the anode feed/return manifold 1802. Rather, in anode recuperator 2000, the second annular pre-reforming passage 1304 and the second annular fuel passage 1006 may be one annular passage connected to the anode feed/return manifold 1802, except that the second annular fuel passage 1006 may not contain catalyst.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. An anode recuperator for a fuel cell system, comprising:
   an annular pre-reformer configured to at least partially reform a fuel;
   an annular first fuel passage configured to provide fuel to the pre-reformer; and
   an annular anode exhaust passage surrounding the first fuel passage and the pre-reformer and located radially to the outside of the pre-reformer, the anode exhaust passage being thermally coupled to the first fuel passage, such that anode exhaust flowing through the anode exhaust passage provides heat to fuel in the first fuel passage,
   wherein the pre-reformer is separated from the anode exhaust passage by the first fuel passage.

2. The anode recuperator of claim 1, wherein the pre-reformer comprises:
   an annular first pre-reforming passage fluidly connected to the first fuel passage; and
   an annular second pre-reforming passage fluidly connected to the first pre-reforming passage and disposed within the first pre-reforming passage.

3. The anode recuperator of claim 2, wherein the pre-reformer is configured such that fuel provided by the first fuel passage flows through the first pre-reforming passage in a first direction and then flows through the second pre-reforming passage in an opposing second direction.

4. The anode recuperator of claim 3, wherein the anode recuperator is configured such that fuel flows through the first fuel passage in the second direction.

5. The anode recuperator of claim 2, further comprising a pre-reforming catalyst disposed in the first pre-reforming passage, the second pre-reforming passage, or both the first pre-reforming passage and the second pre-reforming passage.

6. The anode recuperator of claim 2, further comprising an annular second fuel passage configured to receive reformed fuel from the pre-reformer,
   wherein:
   the anode exhaust passage is thermally coupled to the second fuel passage, such that anode exhaust flowing through the anode exhaust passage provides heat to fuel in the second fuel passage before providing heat to fuel in the first fuel passage;
   the annular pre-reformer is located within a central plenum of the anode recuperator and separated from an inner wall of the annular anode exhaust passage by at least one of the first annular fuel passage and the second annular fuel passage; and
   the annular pre-reformer is located axially inward of at least one of the first annular fuel passage and the second annular fuel passage.

7. The anode recuperator of claim 6, wherein:
   the first and the second fuel passages are located between the annular pre-reformer and the anode exhaust passage;
   an inner wall of the second pre-reforming passage forms a first plenum; and
   an inner wall of the second fuel passage forms a second plenum that is fluidly connected to the first plenum.

8. The anode recuperator of claim 2, wherein:
   the second pre-reforming passage is divided into sections; and
   each section comprises separate pre-reformer catalyst puck.

9. An anode recuperator for a fuel cell system, comprising:
   an annular pre-reformer configured to at least partially reform a fuel;
   an annular first fuel passage configured to provide fuel to the pre-reformer;
   an annular second fuel passage configured to receive fuel from the pre-reformer; and
   an annular anode exhaust passage surrounding the first fuel passage, the second fuel passage, and the pre-reformer, and located radially to the outside of the pre-reformer, wherein:
the anode exhaust passage is thermally coupled the second fuel passage, such that anode exhaust flowing through the anode exhaust passage provides heat to fuel in the second fuel passage, and
the pre-reformer is separated from the anode exhaust passage by at least one of the first fuel passage and the second fuel passage.

10. The anode recuperator of claim 9, wherein:
the first and the second fuel passages are located between the annular pre-reformer and the anode exhaust passage; and
the second fuel passage surrounds the pre-reformer and separates the pre-reformer from the anode exhaust passage.

11. The anode recuperator of claim 10, wherein the pre-reformer comprises:
an annular first pre-reforming passage fluidly connected to the first fuel passage; and
an annular second pre-reforming passage fluidly connected to the first pre-reforming passage and disposed within the first pre-reforming passage.

12. The anode recuperator of claim 11, wherein the pre-reformer is configured such that fuel provided by the first fuel passage flows through the first pre-reforming passage in a first direction and then flows through the second pre-reforming passage in an opposing second direction.

13. The anode recuperator of claim 12, wherein the anode recuperator is configured such that fuel flows through the first fuel passage in the second direction.

14. The anode recuperator of claim 11, further comprising a pre-reforming catalyst disposed in the first pre-reforming passage, the second pre-reforming passage, or both the first pre-reforming passage and the second pre-reforming passage.

15. The anode recuperator of claim 11, wherein:
an inner wall of the second pre-reforming passage forms a first plenum; and
an inner wall of the second fuel passage forms a second plenum that is fluidly connected to the first plenum.

16. The anode recuperator of claim 15, wherein the second fuel passage separates the second plenum from the anode exhaust passage.

17. The anode recuperator of claim 11, wherein:
the second pre-reforming passage is divided into sections; and
each section comprises separate pre-reformer catalyst puck.

18. The anode recuperator of claim 9, wherein the annular pre-reformer is a finned pre-reformer.

19. The anode recuperator of claim 9, wherein:
the annular pre-reformer is located within a central plenum of the anode recuperator and separated from an inner wall of the annular anode exhaust passage by at least one of the first annular fuel passage and the second annular fuel passage; and
the annular pre-reformer is located axially inward of at least one of the first annular fuel passage and the second annular fuel passage.

20. A method of operating a fuel cell system including a fuel cell stack and an anode recuperator of claim 9, the method comprising:
providing a fuel to the annular pre-reformer from the first fuel passage;
at least partially reforming the fuel in the annular pre-reformer to generate a reformed fuel;
providing the reformed fuel to the fuel cell stack using the second fuel passage; and
heating at least one of the fuel in the first fuel passage and the reformed fuel in the second fuel passage using anode exhaust flowing through the annular anode exhaust passage.

21. The method of claim 20, wherein the heating comprises using the anode exhaust to heat the reformed fuel in the first fuel passage and the second fuel passage.

* * * * *